US007681146B2

United States Patent
Hawkins et al.

(12) United States Patent
(10) Patent No.: US 7,681,146 B2
(45) Date of Patent: Mar. 16, 2010

(54) MULTI-CONTEXT ITERATIVE DIRECTORY FILTER

(75) Inventors: Jeffrey C Hawkins, Redwood City, CA (US); Thomas B Bridgwater, San Francisco, CA (US); Robert Y Haitani, Menlo Park, CA (US); Srikiran Prasad, San Francisco, CA (US); William B Rees, Menlo Park, CA (US)

(73) Assignee: Palm, Inc., Sunnyvale, CA (US)

( * ) Notice: Subject to any disclaimer, the term of this patent is extended or adjusted under 35 U.S.C. 154(b) by 834 days.

(21) Appl. No.: 11/112,182

(22) Filed: Apr. 22, 2005

(65) Prior Publication Data

US 2005/0193338 A1   Sep. 1, 2005

(51) Int. Cl.
*G06F 3/048* (2006.01)
*G06F 3/14* (2006.01)
*G06F 3/02* (2006.01)
*G06F 7/00* (2006.01)

(52) U.S. Cl. .................. 715/816; 715/812; 715/864; 345/168; 707/3; 707/104.1

(58) Field of Classification Search ............. 715/812, 715/708, 864, 816, 810; 341/22; 707/3, 707/104.1; 345/168, 173; 704/1
See application file for complete search history.

(56) References Cited

U.S. PATENT DOCUMENTS 3,573,376 A    4/1971  Bartlett et al.
4,279,021 A    7/1981  See et al.
4,415,065 A   11/1983  Sandstedt
4,545,023 A   10/1985  Mizzi
4,587,630 A    5/1986  Straton et al.
4,725,694 A    2/1988  Auer et al.
4,799,254 A    1/1989  Dayton et al.
4,916,441 A    4/1990  Gombrich
4,931,783 A    6/1990  Atkinson
4,972,457 A   11/1990  O'Sullivan
5,010,547 A    4/1991  Johnson et al.

(Continued)

FOREIGN PATENT DOCUMENTS

CA         2187050          5/1997

(Continued)

OTHER PUBLICATIONS

Basterfield, D., "The IBM PalmTop PC110," Jan. 30, 2000, pp. 1-3.

(Continued)

*Primary Examiner*—Ting Lee
(74) *Attorney, Agent, or Firm*—Fenwick & West LLP

(57) ABSTRACT

On a device having keys with multiple values, a user may perform either an iterative directory filtering operation or a direct-dial operation, without specifying which of the operations is intended. The invention thereby allows the user to perform any of a number of different operations to specify a number to be dialed or to identify a directory record, without requiring the user to specify a mode. The invention determines which of the operations the user intends by analyzing the entered keystrokes, and activates the appropriate feedback and functionality for the determined operation. The invention further performs iterative directory filtering on multiple fields concurrently, including derived fields and combination fields.

44 Claims, 15 Drawing Sheets

U.S. PATENT DOCUMENTS

| | | |
|---|---|---|
| 5,067,164 A | 11/1991 | Denker et al. |
| 5,075,684 A | 12/1991 | DeLuca |
| 5,101,439 A | 3/1992 | Kiang |
| 5,127,041 A | 6/1992 | O'Sullivan |
| RE34,034 E | 8/1992 | O'Sullivan |
| 5,189,632 A | 2/1993 | Paajanen et al. |
| 5,227,614 A | 7/1993 | Danielson et al. |
| 5,249,218 A | 9/1993 | Sainton |
| 5,334,824 A | 8/1994 | Martinez |
| 5,335,276 A | 8/1994 | Thompson et al. |
| 5,353,334 A | 10/1994 | O'Sullivan |
| 5,367,563 A | 11/1994 | Sainton |
| D354,478 S | 1/1995 | Miyahara |
| 5,379,057 A | 1/1995 | Clough et al. |
| 5,392,447 A | 2/1995 | Schlack et al. |
| 5,394,140 A | 2/1995 | Wong et al. |
| D359,734 S | 6/1995 | Nagele et al. |
| 5,430,436 A | 7/1995 | Fennell |
| 5,436,960 A | 7/1995 | Campana, Jr. et al. |
| 5,438,611 A | 8/1995 | Campana, Jr. et al. |
| 5,446,759 A | 8/1995 | Campana, Jr. et al. |
| 5,465,401 A | 11/1995 | Thompson |
| 5,479,472 A | 12/1995 | Campana, Jr. et al. |
| 5,485,373 A | 1/1996 | Davis et al. |
| 5,496,992 A | 3/1996 | Madan et al. |
| 5,550,715 A | 8/1996 | Hawkins |
| 5,584,054 A | 12/1996 | Tyneski et al. |
| 5,594,640 A | 1/1997 | Capps et al. |
| 5,612,682 A | 3/1997 | DeLuca et al. |
| 5,625,670 A | 4/1997 | Campana, Jr. et al. |
| 5,631,946 A | 5/1997 | Campana, Jr. et al. |
| 5,640,146 A | 6/1997 | Campana, Jr. et al. |
| 5,640,444 A | 6/1997 | O'Sullivan |
| 5,650,769 A | 7/1997 | Campana, Jr. et al. |
| 5,650,776 A | 7/1997 | Mitchell et al. |
| D385,875 S | 11/1997 | Harris et al. |
| D386,497 S | 11/1997 | Huslig et al. |
| 5,694,428 A | 12/1997 | Campana, Jr. et al. |
| 5,710,798 A | 1/1998 | Campana, Jr. et al. |
| 5,714,937 A | 2/1998 | Campana, Jr. et al. |
| 5,717,725 A | 2/1998 | Campana, Jr. et al. |
| 5,722,059 A | 2/1998 | Campana, Jr. et al. |
| 5,722,064 A | 2/1998 | Campana, Jr. et al. |
| D393,856 S | 4/1998 | Lee et al. |
| 5,742,644 A | 4/1998 | Campana, Jr. et al. |
| 5,745,532 A | 4/1998 | Campana, Jr. et al. |
| 5,751,773 A | 5/1998 | Campana, Jr. et al. |
| D395,300 S | 6/1998 | Yamazaki et al. |
| 5,761,621 A | 6/1998 | Sainton |
| 5,790,659 A | 8/1998 | Strand |
| 5,797,089 A | 8/1998 | Nguyen |
| 5,797,098 A | 8/1998 | Schroeder et al. |
| 5,798,759 A | 8/1998 | Dahl |
| 5,805,633 A | 9/1998 | Uddenfeldt |
| 5,812,117 A | 9/1998 | Moon |
| 5,818,437 A | 10/1998 | Grover et al. |
| 5,819,172 A | 10/1998 | Campana, Jr. et al. |
| 5,825,353 A | 10/1998 | Will |
| 5,825,675 A | 10/1998 | Want et al. |
| 5,854,985 A | 12/1998 | Sainton et al. |
| 5,864,805 A | 1/1999 | Chen et al. |
| 5,884,323 A | 3/1999 | Hawkins et al. |
| D408,021 S | 4/1999 | Haitani et al. |
| D408,030 S | 4/1999 | Richards et al. |
| D409,185 S | 5/1999 | Kawashima |
| D410,486 S | 6/1999 | Takahata et al. |
| 5,918,188 A | 6/1999 | Doran |
| 5,938,772 A | 8/1999 | Welch |
| 5,949,408 A | 9/1999 | Kang et al. |
| 5,952,942 A * | 9/1999 | Balakrishnan et al. ........ 341/20 |
| 5,958,006 A | 9/1999 | Eggleston et al. |
| 5,966,671 A | 10/1999 | Mitchell et al. |
| 5,974,238 A | 10/1999 | Chase, Jr. |
| D416,001 S | 11/1999 | Tal et al. |
| D416,256 S | 11/1999 | Griffin et al. |
| 5,983,073 A | 11/1999 | Ditzik |
| 5,990,872 A | 11/1999 | Jorgenson et al. |
| 5,996,956 A | 12/1999 | Shawver |
| 6,000,000 A | 12/1999 | Hawkins et al. |
| 6,005,496 A | 12/1999 | Hargreaves et al. |
| 6,006,274 A | 12/1999 | Hawkins et al. |
| 6,011,554 A * | 1/2000 | King et al. .................. 715/811 |
| 6,022,156 A | 2/2000 | Blish |
| D421,744 S | 3/2000 | Ono |
| 6,040,829 A | 3/2000 | Croy et al. |
| 6,043,760 A | 3/2000 | Laakkonen et al. |
| D423,468 S | 4/2000 | Jenkins |
| 6,049,796 A | 4/2000 | Siitonen et al. |
| 6,052,735 A | 4/2000 | Ulrich et al. |
| 6,058,304 A | 5/2000 | Callaghan et al. |
| 6,067,451 A | 5/2000 | Campana, Jr. et al. |
| 6,075,925 A | 6/2000 | Downing et al. |
| D432,099 S | 10/2000 | Loh et al. |
| D432,535 S | 10/2000 | Loh et al. |
| D433,016 S | 10/2000 | Matsuda et al. |
| 6,134,453 A | 10/2000 | Sainton et al. |
| 6,141,540 A | 10/2000 | Richards et al. |
| 6,157,630 A | 12/2000 | Adler et al. |
| 6,160,926 A | 12/2000 | Dow et al. |
| 6,169,485 B1 | 1/2001 | Campana, Jr. et al. |
| 6,188,789 B1 | 2/2001 | Marianetti, II et al. |
| D439,232 S | 3/2001 | Ledingham et al. |
| 6,198,783 B1 | 3/2001 | Campana, Jr. et al. |
| 6,204,848 B1 | 3/2001 | Nowlan et al. |
| RE37,141 E | 4/2001 | O'Sullivan |
| D440,959 S | 4/2001 | Wolf et al. |
| 6,219,694 B1 | 4/2001 | Lazaridis et al. |
| D442,156 S | 5/2001 | Lee |
| D443,865 S | 6/2001 | Kim |
| D446,199 S | 8/2001 | Xu et al. |
| 6,272,190 B1 | 8/2001 | Campana, Jr. et al. |
| 6,278,442 B1 | 8/2001 | Griffin et al. |
| 6,288,718 B1 | 9/2001 | Laursen et al. |
| 6,295,372 B1 | 9/2001 | Hawkins et al. |
| 6,295,460 B1 | 9/2001 | Nagel et al. |
| 6,297,795 B1 | 10/2001 | Kato et al. |
| 6,307,548 B1 | 10/2001 | Flinchem et al. |
| 6,310,926 B1 | 10/2001 | Tore |
| D450,307 S | 11/2001 | Xu et al. |
| 6,317,592 B1 | 11/2001 | Campana, Jr. et al. |
| 6,330,618 B1 | 12/2001 | Hawkins et al. |
| D454,349 S | 3/2002 | Makidera et al. |
| D455,135 S | 4/2002 | Hyun |
| 6,370,518 B1 | 4/2002 | Payne et al. |
| 6,377,685 B1 | 4/2002 | Krishnan |
| D456,805 S | 5/2002 | Ono et al. |
| 6,396,482 B1 | 5/2002 | Griffin et al. |
| 6,397,078 B1 | 5/2002 | Kim |
| 6,421,707 B1 | 7/2002 | Miller et al. |
| 6,452,588 B2 | 9/2002 | Griffin et al. |
| 6,477,482 B1 | 11/2002 | Maupin et al. |
| 6,489,950 B1 | 12/2002 | Griffin et al. |
| 6,549,304 B1 | 4/2003 | Dow et al. |
| 6,606,082 B1 | 8/2003 | Zuberec et al. |
| 6,611,254 B1 | 8/2003 | Griffin et al. |
| 6,611,255 B2 | 8/2003 | Griffin et al. |
| 6,611,697 B1 | 8/2003 | Ewing et al. |
| 6,662,244 B1 | 12/2003 | Takahashi |
| 6,665,173 B2 | 12/2003 | Brandenberg et al. |
| 6,677,932 B1 * | 1/2004 | Westerman ................ 345/173 |
| 6,705,520 B1 | 3/2004 | Pitroda et al. |
| 6,725,060 B1 | 4/2004 | Chhatriwala et al. |
| 6,727,916 B1 | 4/2004 | Ballard |
| 6,728,786 B2 | 4/2004 | Hawkins et al. |

| | | | |
|---|---|---|---|
| 6,774,927 B1 * | 8/2004 | Cohen et al. | 348/14.1 |
| 6,857,105 B1 | 2/2005 | Fox et al. | |
| 6,867,763 B2 | 3/2005 | Griffin et al. | |
| 6,873,317 B1 | 3/2005 | Griffin et al. | |
| 6,874,011 B1 | 3/2005 | Spielman et al. | |
| 6,874,037 B1 | 3/2005 | Abram et al. | |
| 6,891,529 B2 | 5/2005 | Ladouceur et al. | |
| 6,919,879 B2 | 7/2005 | Griffin et al. | |
| 6,934,558 B1 | 8/2005 | Sainton et al. | |
| 6,957,397 B1 | 10/2005 | Hawkins | |
| 6,961,584 B2 | 11/2005 | Leedom, Jr. | |
| 7,048,456 B2 * | 5/2006 | Keinonen et al. | 400/495 |
| 7,054,441 B2 | 5/2006 | Pletikosa | |
| 7,061,403 B2 | 6/2006 | Fux | |
| 7,136,897 B1 | 11/2006 | Raghunandan | |
| RE39,427 E | 12/2006 | O'Sullivan | |
| 7,155,521 B2 | 12/2006 | Lahti et al. | |
| 7,313,389 B1 | 12/2007 | Sharp et al. | |
| 2001/0027121 A1 | 10/2001 | Boesen | |
| 2002/0021311 A1 | 2/2002 | Schecter et al. | |
| 2002/0036623 A1 | 3/2002 | Kano | |
| 2002/0058533 A1 | 5/2002 | Nagel et al. | |
| 2002/0063738 A1 | 5/2002 | Chung | |
| 2002/0086702 A1 | 7/2002 | Lai et al. | |
| 2002/0090934 A1 | 7/2002 | Mitchelmore | |
| 2002/0097227 A1 | 7/2002 | Chu et al. | |
| 2002/0126097 A1 | 9/2002 | Savolainen | |
| 2002/0132633 A1 | 9/2002 | Johnson et al. | |
| 2002/0158812 A1 | 10/2002 | Pallakoff | |
| 2002/0186262 A1 | 12/2002 | Itavaara et al. | |
| 2003/0001816 A1 | 1/2003 | Badarneh | |
| 2003/0123627 A1 | 7/2003 | Pinard et al. | |
| 2004/0047505 A1 | 3/2004 | Ghassabian | |
| 2004/0070567 A1 * | 4/2004 | Longe et al. | 345/156 |

FOREIGN PATENT DOCUMENTS

| | | |
|---|---|---|
| EP | 0149762 A1 | 7/1986 |
| EP | 0 813 328 A2 | 12/1997 |
| EP | 0 840 934 B1 | 4/1999 |
| EP | 933908 A2 | 8/1999 |
| EP | 1071029 A2 | 1/2001 |
| WO | WO 94/10678 | 5/1994 |
| WO | WO 94/16408 | 7/1994 |
| WO | WO 96/01453 | 1/1996 |
| WO | WO 00/65445 | 11/2000 |

OTHER PUBLICATIONS

Blackberry Handheld Installation & Getting Started Guide, © 2002 Copyright by Research in Motion Limited, 295 Philip Street, Waterloo, Ontario, Canada N2L 3W8. Revised Feb. 27, 2003, pp. 39-41. (www. rim.net).

Microsoft, "The Windows Interface an Application Design Guide," 1987, pp. 84-87, Figures 1-6.

Motorola V60i Wireless Phone User Manual, Personal Communications Sector, Motorola, Inc., 600 North U.S. Highway 45, Libertyville, Illinois (www.motorola.com), pp. 1 and 53. url=http://www.motorola.com/mdirect/manuals/v60i_TDMA_User_Manual_E.pdf.

Motorola Series 60g Wireless Phone User Manual, © 2001 Motorola, Inc., published by the Personal Communications Sector, 600 North U.S. Highway 45, Libertyville, Illinois (www.motorola.com), pp.1-3.

Newton MessagePad Handbook, © 1994 Apple Computer, Inc., 1 Infinite Loop, Cupertiono, CA, pp. 14-19, 22 and 23. (www.apple.com).

Progue, D., "PalmPilot: The Ultimate Guide," O'Reilly, 2nd Edition, Chapter 1-4.

SyncML Sync Protocol, version 1.0.1, 2001, pp. 1-61.

United States Court of Appeals for the Federal Circuit: *Wireless Agents LLC v. Sony Ericsson Mobile Communications AB and Sony Ericsson Mobile Communications* (USA), Inc., Decided Jul. 26, 2006, 7 pages.

Filing of translation of European Patent (UK) under Section 77(6)(a), European patent No. 1218814, Apr. 9, 2003, 13 pages.

U.S. Appl. No. 09/953,211, filed Sep. 17, 2001, Claims 26-30.

U.S. Appl. No. 09/813,165, filed Mar. 21, 2001, Claims 24-29.

U.S. Appl. No. 09/670,696, filed Sep. 28, 2000, Claims 25-46.

U.S. Appl. No. 07/831,671, filed Feb. 5, 1992, Claims 25-55.

*American Programmer*, N.Y., American Programmer, Inc. (Dec. 1991), pp. 4-33.

*At Last, Technology Harnesse [sic] One of the Most Powerf [sic] Forces known to Man.*, Foster City, GO Corporation, 1991, 14 pages.

At&T New Release, *NCR Cuts Price of 3170 Notebook Computer 11 to 19 Percent* [online]. (Mar. 8, 1993), Retrieved from the Internet: <URL:http://www.att.com/press/0393/930308.nca.html> 2 pages.

BlackBerry Handheld Users Guide, Sep. 7, 1999.

BlackBerry Developer's Guide SDK User's Guide Version 2.0 (Data TAC), Jun. 12, 2000.

BlackBerry Desktop Software Installation and Getting Started Guide, Feb. 5, 1999.

BlackBerry Enterprise Server Software Installation and Getting Started Guide, Sep. 29, 1999.

Carr, R.M., *The Point of the Pen, Byte* (Feb. 1991, Reprinted), 10 pages.

Choi, H., *First Look: Samsung I300 Cellphone/PDA*, retrieved from internet www.techtv.com, Mar. 28, 2001.

Compaq Product Information, *iPAQ Pocket PC Options*, [retrieved Nov. 13, 2001], retrieved from internet: www.compaq.com/products/handhelds,.

Cullen, A., *Connecting With Your EO Cellular Module*, Mountain View, EO, Inc., 1992, 1993, pp. ii-33.

Cullen, A., *Getting Started With Your EO Personal Communicator*, Mountain View, EO, Inc., 1992, 1993, pp. ii-74.

Cullen, A., *Lookup Guide to the EO Personal Communicator*, Mountain View, EO, Inc., 1992, 1993, pp. ii-320.

*Go Corporation Information Statement*, (Nov. 8, 1993), 114 pages.

Handspring Product Information: *VisorPhone The Springboard Module that Transforms your Visor into an Extraordinary Phone*, (2000).

Handspring, *Sprint and Airprime Delivery First Wireless CDMA Phone and Data Module for the Handspring Visor*, [retrieved Aug. 6, 2001], retrieved from internet www.handspring/pr59.jhtml.

Handspring VisorPhone Module User Guide, (2000-2001).

*IBM Selects Racotek Data/Voice Communications Services to Interface With Touchmobile Product*, PR Newswire (Jan. 25, 1993), 2 pages.

IBM Technical Disclosure Bulletin: *SimpleUser Interface to a Cellular Telephone*, Oct. 1995, pp. 349-350, [retrieved Jul. 5, 2001], retrieved from internet.

IBM Technical Disclosure Bulletin: *Inexpensive Personal Digital Assistant*, Apr. 1995, pp. 525-526, [retrieved Jul. 5, 2001], retrieved from internet.

*IBM TouchMobile Information and Planning Guide, International Business Machines Incorporated* (Mar. 1993), 20 pages.

*IBM TouchMobile Solution for Data Capture and Communication, Keeping Your Business Moving in the 90s, International Business Machines Incorporated* (Jan. 1993), 13 pages.

*IBM'S Touchmobile Helps Field Workers Collect Data at the Touch of a Finger*, PR Newswire (Jan. 26, 1993), 2 pages.

Kyocera's Smartphone Series, retrieved from internet www.kyocera-wireless.com, 2001.

MacNeill, D., *Messaging Card and NewtonMail: We Pick Up and Deliver*, On The Go Magazine [online]. (Oct. 13, 1993), Retrieved from the Internet: <URL:http://www.pencomputing.com/Newton/NewtonNotes2.html> 2 pages.

MacNeill, D., *Wireless Newton Technology Goes to Work, On The Go Magazine* [online]. (Sep. 8, 1993), Retrieved from the Internet: <URL:http://www.pencomputing.com/Newton/NewtonNotes1.html >2 pages.

Maki, K., *The AT&T EO Travel Guide*, N.Y., John Wiley & Sons, Inc., 1993, pp. iii-555.

Mossberg, W., *Samsung Embeds Cellphone Inside Palm in New I300 Device*, Aug. 30, 2001, [retrieved Oct. 26, 2001], retrieved from internet http://www.ptech.wsj.com/archive/ptech-20010830.html.

Newspaper Article: *Ways to Escape Multiple-Remote Hell*, San Jose Mercury News, Jun. 14, 2001.

Nokia 9110 Accessories Quick Guide Instruction Manual, 1999.

Schlender, B. R., *Hot New PCs That Read Your Writing, Fortune* (Feb. 11, 1991, Reprinted), 6 pages.

Sprint PCS User Guide—Samsung Model SCH-8500, 1999.

Stock, R., *The World of Messaging An Introduction to Personal Communications*, Mountain View, EO, Inc., 1992, 1993, pp. ii-69.

SyncML Website Introduction Page, SycnML Initiative LTD., [Retrieved on Oct. 24, 2002]. Retrieved from the Internet: <URL: http://www.syncml.org/about-intro.html>, 2 pages.

SynML Sync Protocol [Retrieved on Dec. 7, 2000]. Retrieved from the Internet: <URL:http://www.syncml.org/docs/syncml_protocol_v10_20001207.pdf>, 60 pages.

SynML Sync Protocol Version 1.0.1 [Retrieved on Jun. 15, 2001]. Retrieved from the Internet: <URL:http://www.syncml.org/docs/syncml_protocol_v101_20010615.pdf>, 61 pages.

Tam, P., "Palm, Motorola to Make PDA Cell Phones", Sep. 25, 2000, [retrieved Jun. 19, 2001], retrieved from internet http://www.zdnet.com/zdnn/stories/news/0,4586,2631800,00.html.

Technical White Paper BlackBerry Enterprise Edition for Microsoft Exchange, Version 2.1, (1999-2001).

Technical White Paper BlackBerry Enterprise Server for Microsoft Exchange, Version 2.1, (1997-2001).

Tucows PDA Phone GSM Dailer: GSM Dailer 1.0, Nov. 30, 2000, [retrieved Jun. 19, 2001], retrieved from internet http://pds.rcp.net/pe/pocket/preview 154208.html, Jun. 19, 2001.

User's Guide, hp iPAQ Pocket PC h4000 Series, Document Part Number: 343434-001, Aug. 2003, 141 pages.

Wireless Application Protocol, Service Loading, WAP-168-ServiceLoad-20010731-a, Version Jul. 31, 2001, 18 pages.

Wireless Application Protocol, Service Indication, WAP-167-Servicelnd-20010731-a, Version Jul. 31, 2001, 28 pages.

Wireless Application Protocol, Push Message, WAP-251-PushMessage-20010322-a, Version Mar. 22, 2001, 14 pages.

Wireless Application Protocol, WAP-Sync-Spec, Data Synchronisation Specification, WAP-234-SYNC-20010530-a, Version May 30, 2001, 11 pages.

Wireless Application Protocol, Wireless Application Protocol, Wireless Markup Language Specification Version 1.3, WAP WML, WAP-191-WML, Feb. 19, 2000, 110 pages.

* cited by examiner

MULTI-CONTEXT ITERATIVE DIRECTORY FILTER

CROSS-REFERENCE TO RELATED APPLICATIONS

This application is a continuation of U.S. patent application Ser. No. 09/976,477, for "Multi-Context Iterative Directory Filter," filed on Oct. 12, 2001, which claims priority from U.S. Provisional Patent Application Ser. No. 60/297,817 for "Handheld Device," filed on Jun. 11, 2001. The disclosures of these applications are incorporated herein by reference.

BACKGROUND OF THE INVENTION

1. Field of the Invention

The present invention is related to retrieving directory records, and more particularly to multi-context iterative directory filter techniques including 1) concurrent operation in a directory filtering mode and a direct-dial mode, without requiring the user to specify which mode is intended; and 2) concurrent filtering based on two or more directory fields.

2. Description of the Background Art

Many handheld devices, such as personal digital assistants (PDAs), cellular telephones, laptop computers, and the like, provide electronic directories of contact information. Such directories are often capable of storing a large number of entries, or records, each corresponding to an individual or business. Many types of information may be stored in directory records, such as names, postal addresses, telephone numbers, e-mail addresses, and other contact information. Using an interface for interacting with the directory, users can add, edit, and delete records as needed, to keep the directory up to date.

Users may retrieve records stored in electronic directories in a variety of ways. The particular mechanics for retrieving directory records depend upon many factors, including for example the nature and purpose of the device, the hardware configuration and design of the device (including display, keyboard, and the like), the user interface of the directory software, the nature of the user's contemplated interaction with the device, the context in which the interaction takes place, the user's preferences and level of expertise in operating the device, and the like. Some common techniques for retrieving a directory record include: scrolling through a displayed list; searching for one or more keywords entered by the user; pressing a key corresponding to an initial letter of the person's name; typing the first few letters of the person's name; and the like.

One technique for retrieving a directory record is iterative filtering. The user enters letters in succession, and the device displays directory records that match the letters entered. As the user enters each letter, the number of displayed records is iteratively filtered, so that fewer and fewer records tend to be displayed. When only one record is displayed, it may be automatically selected. At any time during the iterative filtering, the user can navigate (e.g. by scrolling) among displayed records to select the desired record.

For example, suppose a directory contains the following records (among others):
Rafferty, Janine
Raiklen, Bill
Rainey, Mark
Rea, Stacy
Sackman, Eric A user seeking to retrieve the directory record for Bill Raiklen would enter each letter in the person's last name in sequence. After entering the first letter, "R", Eric Sackman's name would be filtered out (since it does not begin with "R"), leaving:
Rafferty, Janine
Raiklen, Bill
Rainey, Mark
Rea, Stacy After entering the next letter, "A", Stacy Rea's name would be filtered out (since it does not begin with "RA"), leaving:
Rafferty, Janine
Raiklen, Bill
Rainey, Mark After entering the next letter, "I", Janine Rafferty's name would be filtered out (since it does not begin with "RAI"), leaving:
Raiklen, Bill
Rainey, Mark Finally, after entering the next letter, K, Mark Rainey's name would be filtered out, so that only Bill Raiklen's name remains. At this point, the directory record for Bill Raiklen could automatically be retrieved or his name automatically selected. Thus, the user is able to specify one of the listed directory records with a minimum of keystrokes. The user need not enter the remaining letters in Bill Raiklen's name, since the system is now able to determine which directory entry the user is attempting to specify, even though only four keystrokes have been entered.

One limitation of the above-described conventional technique is that the user can only search on one field, in this case the last name. In general, in such iterative filtering operations as provided in the art, filtering is performed with respect to a predefined field (such as last name). Thus, if the user attempts to locate a record by entering keystrokes for a different field (such as first name, for example), the user may fail to retrieve the intended record. Conventional iterative filtering techniques do not generally provide a mechanism for concurrently filtering a directory according to the user's entries as compared with two or more directory fields.

In addition to retrieving records from an electronic directory, many users often dial numbers directly into the device. For example, if a user of a cellular telephone wishes to call someone who is not listed in the user's directory, the user may dial the person's number via a keypad on the telephone. Typically, such an operation is performed in a different mode than the directory lookup mode, so that there is no ambiguity as to which type of operation (directory lookup or direct-dial) the user wishes to perform. Usually, the user must explicitly select which mode is desired, by navigating through displayed menus or by executing commands in accordance with the user interface of the device.

In many handheld devices, multiple-value keys are provided, so as to save space and reduce the total number of keys. For example, some keys may correspond to a numeric value as well as an alphabetic value. Depending on the current mode of operation, pressing the key results in entry of either the numeric value or the alphabetic value. Thus, a dialing mode may be provided for direct entry of a telephone number to be dialed, and a directory retrieval mode may also be provided for retrieving directory records. Both operations may use the same keys; thus, a particular key may have a numeric value for use in the dialing mode and an alphabetic value for use in the directory retrieval mode.

It is often important that tasks such as dialing numbers or locating a particular contact record be as easy as possible to carry out. Many such handheld devices are used in environments where the user's ability to concentrate on the task of retrieving a directory record is limited, or where the user is attempting to perform such a task while concurrently performing other tasks. Accordingly, it is advantageous for electronic directories to be easily navigated and for records to be easily retrieved.

Requiring explicit selection of a mode can make the device cumbersome and difficult for users to operate. In many environments, users are not familiar with the mode selection requirement, or are operating the device while driving, or are otherwise unable to explicitly select a mode before performing an operation on the device.

What is needed, therefore, is a system, method, and user interface that allows a user to perform any of a plurality of operations, including directory retrieval and direct-dialing, on a device having multiple-value keys, without having to specify a mode before beginning the desired operation. What is further needed is a system, method, and user interface that performs iterative filtering of a directory concurrently with accepting keystrokes for a direct-dial operation. What is further needed is a system, method, and user interface that automatically determines which operation the user intends, so that the user is not required to specify a mode. What is further needed is a system, method, and user interface that allows a user to retrieve directory records according to any of a number of different fields (such as first name, last name, initials, and the like) without having to specify which field is being searched on. What is further needed is a technique for performing iterative filtering of a directory with respect to multiple fields concurrently, including stored fields, derived fields, and/or combination fields.

SUMMARY OF THE INVENTION

The present invention performs multi-context iterative directory filtering in a device having multiple-value keys. The user may perform direct-dialing on the same keys that are used for iterative directory filtering. The invention determines which operation the user intends by analyzing the entered keystrokes, and activates the appropriate feedback and functionality for the determined operation. In one aspect, where the determination cannot be made, both types of feedback are shown. In another aspect, where the determination cannot be made, the invention assumes the user is attempting directory filtering. In yet another aspect, where the determination cannot be made, the invention assumes the user is attempting direct-dialing.

In one aspect, the invention compares a user-entered series of key-strokes with a set of directory records, where at least some of the keystrokes are associated with multiple values. Directory records that do not match the key-stroke series are filtered out; directory records that do match the keystroke series are displayed. For those keys having multiple values, filtering is performed using each of the possible values, so that a directory record is filtered out only if it fails to match any of the possible values for the keystroke series. As the user enters additional keystrokes, the invention repeats the filtering process against the directory, so that the set of matching directory records tends to decrease in size with successive keystrokes.

In one aspect, if the user-entered series can be interpreted as both a direct-dial number and a directory lookup operation, the invention provides feed-back appropriate for both operations concurrently, and allows the user to select between the two operations either explicitly or by entering additional keystrokes that implicitly (but unambiguously) specify the desired operation.

In another aspect, if the user-entered series can be interpreted as both a direct-dial number and a directory lookup operation, the invention provides feedback appropriate for the directory lookup operation, but allows the user to select between the two operations either explicitly or by entering additional key-strokes that implicitly (but unambiguously) specify the desired operation. If the additional keystrokes specify that the direct-dial operation is desired, the invention deletes the displayed feedback for the directory lookup operation and provides feedback for the direct-dial operation.

In another aspect, if the user-entered series can be interpreted as both a direct-dial number and a directory lookup operation, the invention provides feedback appropriate for the direct-dial operation, but allows the user to select between the two operations either explicitly or by entering additional key-strokes that implicitly (but unambiguously) specify the desired operation. If the additional keystrokes specify that the directory lookup operation is desired, the invention deletes the displayed feedback for the direct-dial operation and provides feedback for the directory lookup operation.

If, at any point, the user-entered keystrokes unambiguously indicate the type of operation desired, the invention makes the appropriate inference, provides feedback for the desired operation, and proceeds with the desired operation.

For example, in an application where the user may dial numbers directly as well as perform directory lookup functions, the invention may operate as follows. Initially, as keystrokes are entered and both operations are possible, feedback corresponding to the directory lookup operation is displayed. If the user-entered keystroke series does not correspond to any directory record, but does correspond to a numeric sequence, the invention may infer that the user is attempting to dial a number directly. Thus, the invention may remove the directory lookup feedback and instead display feedback appropriate to a direct-dial operation.

Alternatively, as keystrokes are entered and both operations are possible, feedback corresponding to both operations may be displayed. If the user enters a keystroke that does not correspond to a numeric value, the invention may infer that the user is not attempting to dial a number directly. The invention may then remove the direct-dial feedback from the screen and proceed with the directory lookup operation. Conversely, if the user-entered keystroke series does not correspond to any directory record, but does correspond to a numeric sequence, the invention may infer that the user is attempting to dial a number directly. Thus, the invention may remove the directory lookup feedback and proceed with the direct-dial operation.

In one aspect, the invention makes the aforementioned determinations after each keystroke, so that the filtering process is iterative. As the user enters each keystroke, the invention determines which operations are still possible given the entered sequence, and adjusts the displayed feedback appropriately.

In another aspect, the invention attempts to make the aforementioned determinations after each keystroke, but if the user rapidly enters a sequence of keystrokes, the invention may wait until an appropriate pause in the sequence, or until a predetermined number of keystrokes are received, before making the aforementioned determinations.

In another aspect, the invention makes the aforementioned determinations after completion of a keystroke sequence, or when the user pauses in entering keystrokes, or when the user enters a command specifying that the determination of operation should take place.

In another aspect, the user may override the invention's determination, or may manually specify which operation is desired, or may manually specify a mode of operation. Such specification may be made before, during, or after entry of the keystrokes.

In another aspect, feedback for each of the possible operations is displayed, or is not displayed, according to user preferences, predefined settings, or other considerations. Thus, where such feedback might confuse the user, the invention may avoid such confusion.

In another aspect, directory lookup is performed concurrently with respect any of several fields, such as for example last name, first name, initials, company name, and the like. Derived fields may also be included, such as for example first initial plus last name. Combination fields may also be included, such as for example first name plus last name. The selection of which fields, derived fields, and/or combination fields are to be searched on may be predetermined or may be user-configurable, if desired. The invention filters out a record only when values in all of the specified fields fail to match the entered key-strokes. In one aspect, multiple-field directory filtering is performed concurrently with direct-dial entry, as described above, until the operation the user is attempting to perform is unambiguously determinable.

In another aspect, the user can retract a keystroke entry, for example by backspacing. The invention returns to the state that existed before the key-stroke took place. Thus, if an operation is no longer valid based on a keystroke sequence, it may be reinstated if the user backspaces. Similarly, previously eliminated directory records may reappear after the user backspaces.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

For illustrative purposes, the invention will be described in the context of a personal digital assistant (PDA) that provides functionality for direct-dialing of telephone numbers, as well as directory lookup. Accordingly, the invention is described as a mechanism for allowing the user to direct-dial a telephone number or to perform directory lookup, without first specifying which of the two operations he or she wishes to perform. In alternative embodiments, the invention provides directory filtering in multiple contexts concurrently, such as by permitting a user to filter directory records by any of a number of search criteria (including stored fields, derived fields, combination fields, and the like) without first specifying which criterion is being searched on. Such functionality may or may not be combined with direct-dial capability as well. One skilled in the art will recognize that many variations are possible, and that the particular embodiment described herein should not be considered to limit the scope of the invention in any way.

Device and Keyboard

Figure 1:
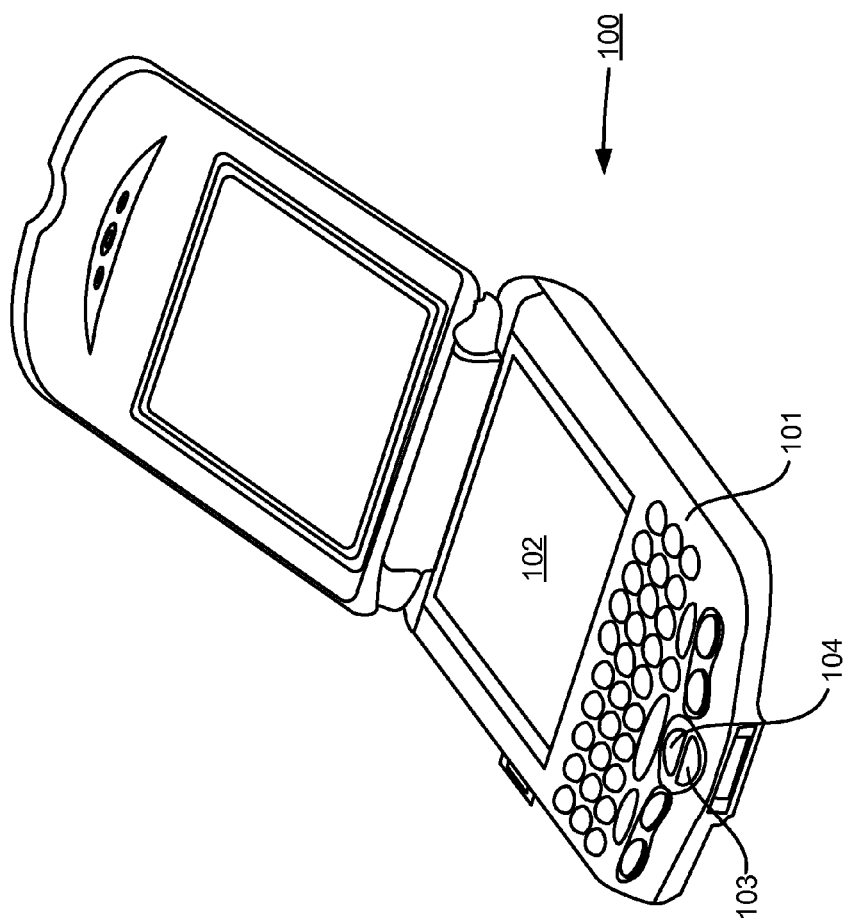
FIG. 1 is an oblique view of a device for practicing the present invention according to one embodiment.

Referring now to FIG. 1, there is shown PDA device 100 for practicing the present invention according to one embodiment. As is known in the art of such devices, PDA device 100 includes directory lookup and directory filtering functionality. In one embodiment, device 100 also includes cellular telephone technology for dialing, initiating, and receiving telephone calls, though such technology is not required for practicing the present invention. One skilled in the art will recognize that the present invention may be implemented in other devices or types of devices, including but not limited to: handheld, laptop, or desktop computers; cellular telephones; Internet appliances; and the like. In fact, the invention may be implemented in any device in which multiple-context searches are desired.

Device 100 includes keyboard 101 for accepting input from the user, and screen 102 for providing output and for presenting a user interface to the user. Keyboard 101 accepts alphabetic and numeric input, and further accepts commands from the user to activate various functions, scroll the display, and the like. In one embodiment, screen 102 may be a touch screen that accepts input from the user by detecting positioning of a stylus or finger. Thus, for example, a user could select a displayed record by touching screen 102 at the appropriate location. Other keystroke entry devices or character entry devices may also be employed. The use of the word "keystroke" in this patent is intended to cover any character that is entered using any input devices, and is not limited to a particular embodiment for entering character data.

Techniques for the input and output components of PDA device 100 are well known in the art. Scroll up button 104 and scroll down button 103 perform scrolling functions for navigating through on-screen data and commands.

In one embodiment, PDA device 100 runs software that controls the operation of the device including input, output, and directory lookup and filtering operations. The functionality described herein may therefore be embodied in software that runs on PDA device 100 and that causes PDA device 100 to function in a particular manner to implement the invention. In one embodiment, the software runs in an operating system environment, such as for example the Pal-mOS Operating System (or a variant thereof).

Figure 2:
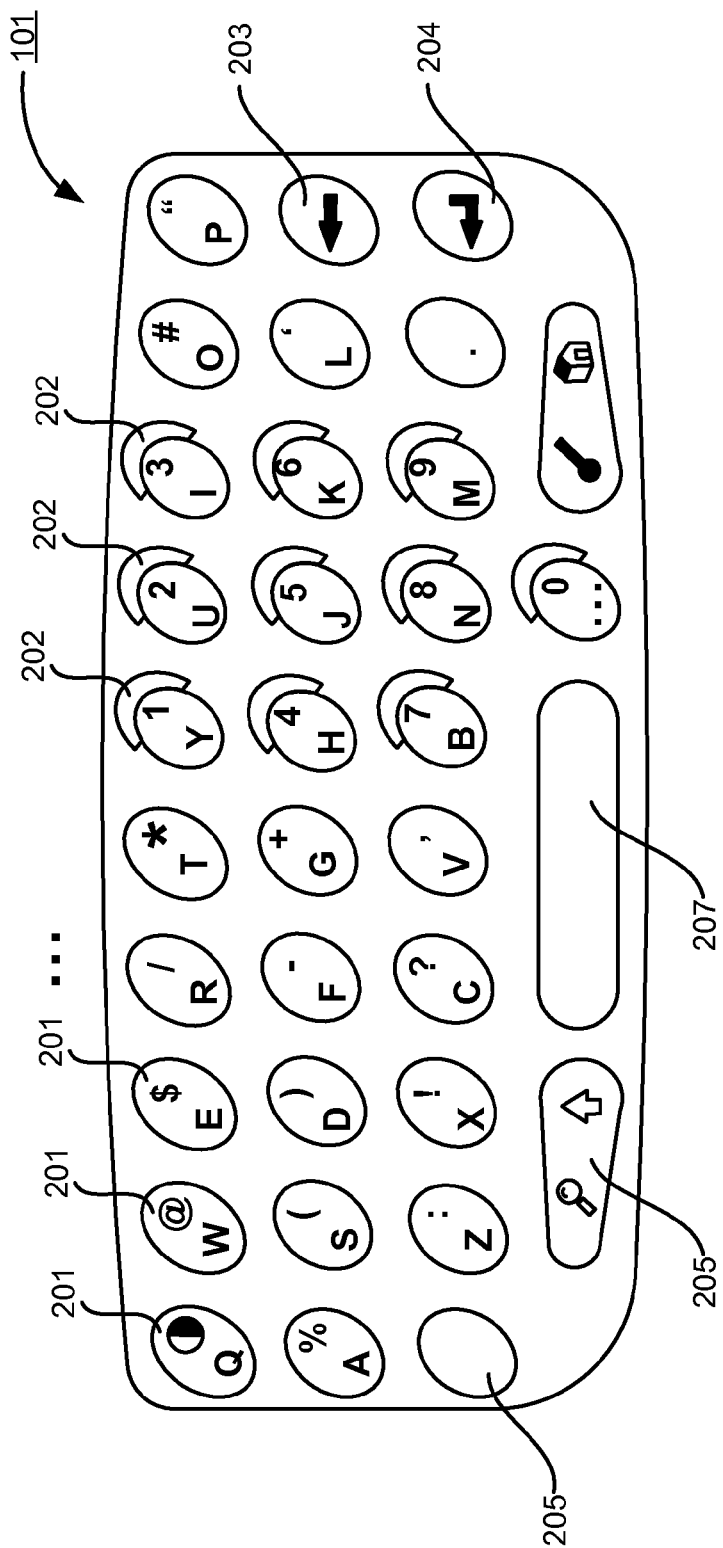
FIG. 2 is a plan view of a keyboard including multiple-value keys for practicing the present invention according to one embodiment.

Referring now to FIG. 2, there is shown an example of keyboard 101. Keys 201 and 202 are provided for entry of alphabetic and punctuation data. Keys 201 and 202 contain multiple values, so that when a user presses one of keys 101 or 102, a primary value (usually a letter of the alphabet) may be entered, or a secondary value (usually a number or punctuation symbol) may be entered. For example, the 'E' key has a secondary value of '$', so that when a user presses this key, either an 'E' or a '$' is entered. The selection of which value to enter may depend upon the context of the entry, or the field being filled, or on any other factors. Alternatively, the user may explicitly select the secondary value by 1) pressing option key 205 before pressing key 201 or 202, or by 2) holding down option key 205 while pressing key 201 or 202. Thus, if the user wishes to enter a '$', he or she would press option key 205, followed by the 'E' key. Additionally, in one embodiment, if option key 205 is pressed twice, an "option lock" mode is engaged, wherein any number of subsequent keystrokes activate their secondary values until option key 205 is pressed again to deactivate the "option lock" mode.

Shift key 206 also modifies the value entered by a keystroke. In some contexts, the user can enter an uppercase character by 1) pressing shift key 206 before pressing key 201 or 202, or by 2) holding down shift key 206 while pressing key 201 or 202.

Keyboard 101 also includes backspace key 203, which deletes the most recently entered character, and enter key 204 (also referred to as return key), which indicates that the user's entry of a keystroke sequence is complete. Enter key 204 may also be used to activate a command or indicate a selection of an on-screen item, as appropriate. Space bar 207 enters a space character, or may be used to activate a command or indicate a selection, depending on the context in which it is used.

Some keys 202 contain, as one of their multiple values, a numeric value. Accordingly, a user may use keys 202 when direct-dialing a telephone number. Keys 202 are a subset of the total set of keys on keyboard 101. In the example shown, keys 202 are denoted by a semi-oval design that distinguishes them from other keys 201. However, one skilled in the art will recognize that any means for denoting numeric keys 202 may be employed, including but not limited to visual or tactile indicators on or near the particular keys 202. Alternatively, if desired, such keys 102 may be given an appearance that is substantially similar to other keys 201, with no particular indicia for distinguishing them from other keys 201.

Method of Operation

In one embodiment, the present invention allows the user to dial a number or to perform directory filtering, without specifying in advance which of the two operations is intended.

In one embodiment, the invention assumes that the user is attempting to perform directory filtering, and displays directory filtering results accordingly. As long as the directory filter produces at least one result, the filter results continue to be displayed. If, however, the directory filter produces no results, and the keystroke sequence has a numeric value, then the numeric value of the key-stroke sequence is displayed instead of directory filtering results. Thus, the invention switches to displaying dialed numbers if it becomes evident that the user is performing a direct-dial operation.

In another embodiment, the invention assumes that the user is attempting to perform a direct-dial operation, and displays dialed numbers. As long as the user continues to enter keystrokes that have numeric values, the numeric sequence continues to be displayed. If, however, the user enters a keystroke having no numeric value, and the keystroke sequence corresponds to a lookup string that generates filter results, then the filtered directory results are displayed instead of the numeric value of the keystroke sequence. Thus, the invention switches to displaying filtered directory results if it becomes evident that the user is performing a directory lookup operation.

In yet another embodiment, the invention concurrently displays numeric values corresponding to a dialed number, along with directory filtering results corresponding to the text values of the user's keystrokes. If the first key-stroke has a numeric secondary value, that numeric value is displayed. If subsequent keystrokes also have numeric secondary values, those numeric values continue to be displayed. As long as the directory filter produces results and all entered keystrokes have numeric values, both the filter results and the numeric values continue to be displayed. If a keystroke with no numeric secondary value is entered, the numeric values disappear from the screen. If, on the other hand the directory filter produces no results, only the numeric value of the keystroke sequence is displayed.

Each of these embodiments will be described in more detail below.

Figure 3A:
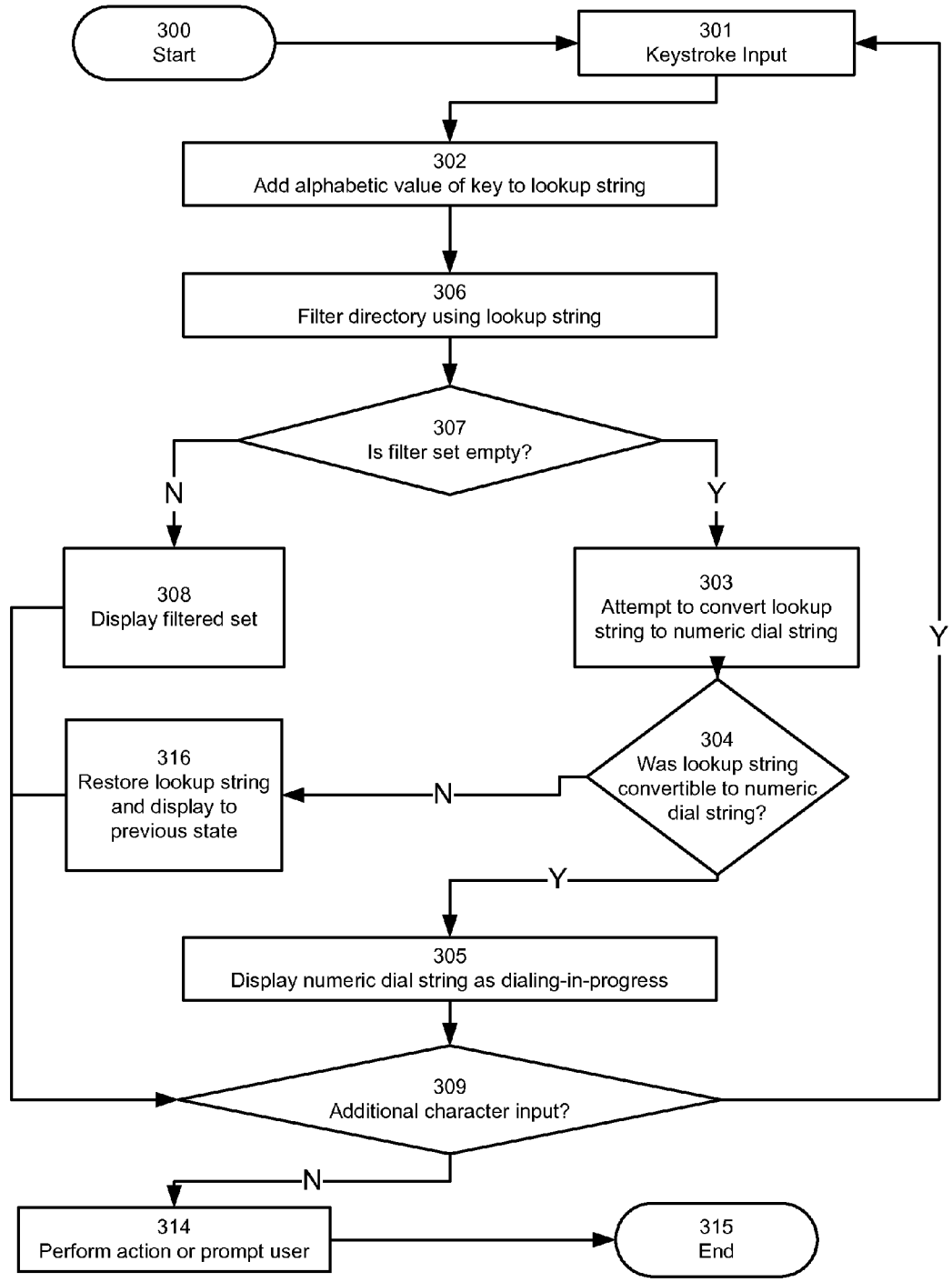
FIG. 3A is a flowchart depicting operation of the present invention according to one embodiment, where a directory filtering operation is initially assumed.
Figure 4:
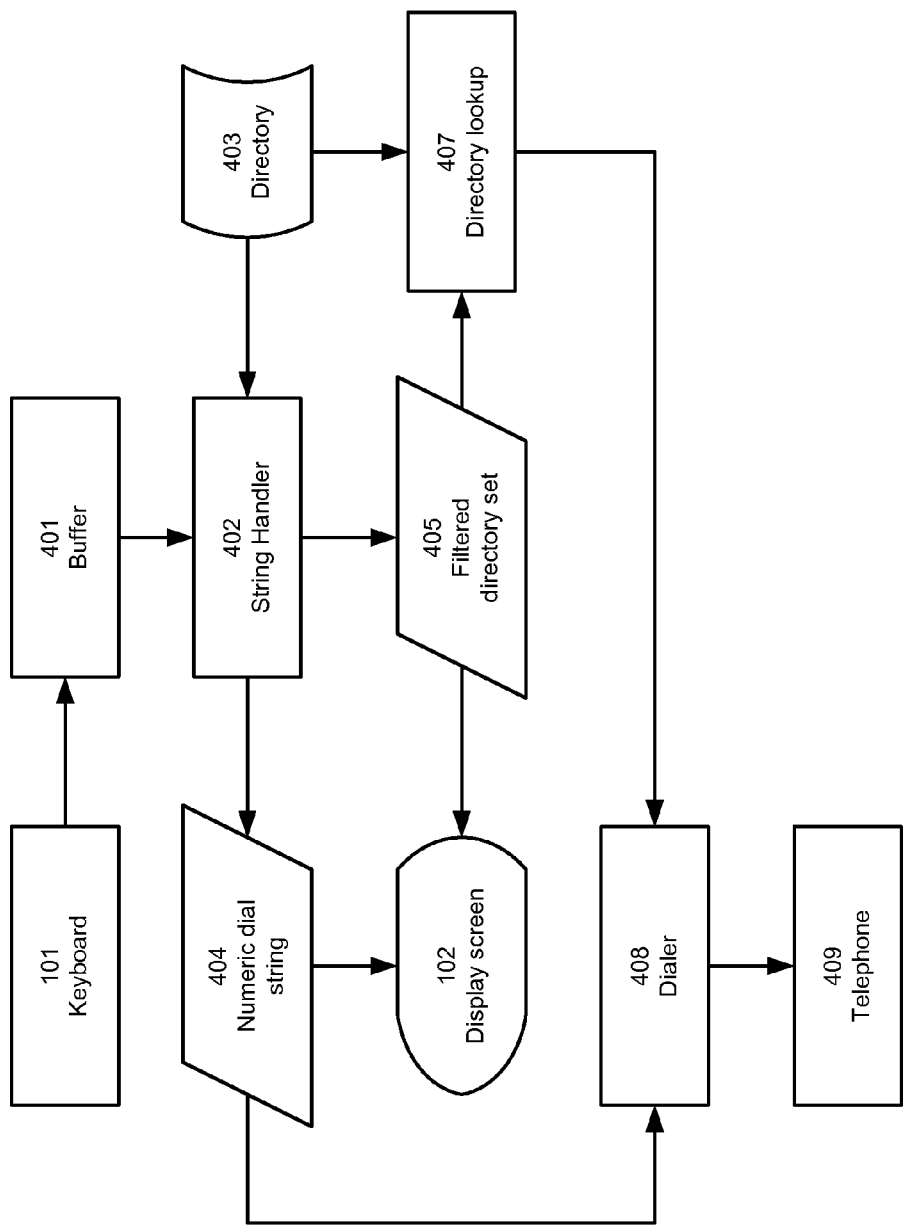
FIG. 4 is a block diagram depicting a functional architecture for implementing the present invention according to one embodiment.

Referring now to FIG. 3A, there is shown a flowchart depicting operation of the present invention according to one embodiment, where a directory filtering operation is initially assumed. Referring also to FIG. 4, there is shown a conceptual block diagram of a functional architecture for implementing the present invention according to one embodiment. One skilled in the art will recognize that the flowchart of FIG. 3A and the block diagram of FIG. 4 are merely exemplary, and that other structures and methods for implementing the invention may be used.

The user presses keys on keyboard 101 (or provides character input via some other character input device). Upon receipt of such keystroke input 301, the invention adds 302 the value of the pressed key to a stored lookup string. In one embodiment, the lookup string may be initialized as a null string prior to step 301. In one embodiment, step 302 and subsequent steps of FIG. 3A may be performed in response to each individual keystroke. In an alternative embodiment, the invention attempts to perform step 302 and subsequent steps of FIG. 3A in response to each keystroke, but if the user rapidly enters a sequence of key-strokes, the invention may wait until an appropriate pause in the sequence, or until a predetermined number of keystrokes are received, before proceeding with step 302 and subsequent steps of FIG. 3A. In another alternative embodiment, the invention performs step 302 and subsequent steps of FIG. 3A after completion of a keystroke sequence, or when the user pauses in entering keystrokes, or when the user enters a command specifying that the determination of operation should take place.

In one embodiment, the lookup string contains primary values of keys (such as alphabetic values, for example). In another embodiment, some coding mechanism is employed to indicate which keys are pressed, so that a coded string is formed that can later be decoded and interpreted as appropriate. If, when step 302 is to be performed, no lookup string yet exists, it may be initialized upon receipt of the first keystroke input 301. Alternatively, a null string may be initialized before commencing the method of FIG. 3A. Once a lookup string has been established, it is stored, for example, in buffer 401 or in any other mechanism for storing strings of data.

After the stored lookup string has been established or modified by the addition of a new keystroke value in step 302, the invention performs a filtering operation 306 on a stored directory 403, using the lookup string, to obtain a filtered directory set 405. The filtering operation may be performed according to techniques that are well known in the art. For example, the invention may include, in set 405, all directory records having a first name that begins with the lookup string. In one embodiment, the filtering operation 306 is applied to more than one field of each directory record, or to any combination of stored fields, derived fields, and/or combination fields. Thus, set 405 may include all directory records having a first name, last name, initials, or company name that begins with the lookup string. Any number of fields within directory records may be identified for matching in this manner. Thus, the invention is capable of performing a multiple-field filtering operation, in which the user may enter filtering criteria for any of a number of fields without first specifying which field is to be filtered on. The particulars of multiple-field filtering according to one embodiment are described in more detail below.

The invention determines 307 whether the filtering operation yielded any results. If the filtered set 405 is not empty, meaning that at least one directory record matches the lookup string, the filtered set 405 is displayed 308 on screen 102. In one embodiment, as will be described in more detail below, set 405 is displayed as a scrolling list, particularly if there are more records than can fit on screen 102. The user can navigate among the displayed records in set 405 and can select individual records for further operation, such as viewing records, modifying records, dialing numbers, and the like.

Functionality for navigating within a record set and for selecting individual records is implemented, in one embodiment, according to techniques that are well known in the art. For example, the user may navigate using scroll buttons, on-screen buttons, jog controls, and the like; the user may select records by pressing enter key 204, or by tapping touch screen 103 at the location where the record is displayed, or by other means.

Figure 5:
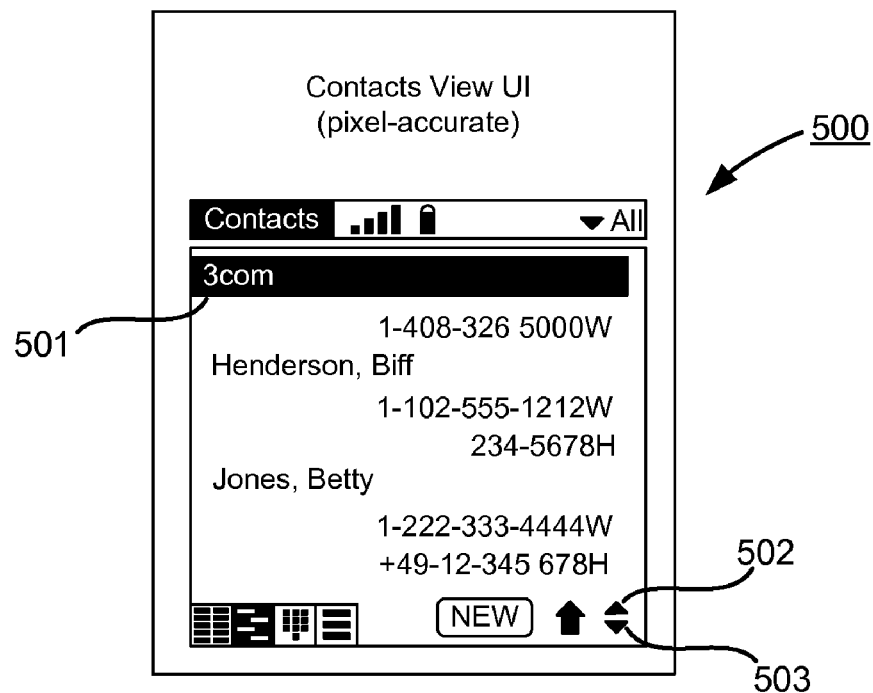
FIG. 5 is a screen shot depicting a contacts view according to one embodiment of the present invention.

Referring momentarily to FIG. 5, there is shown a screen shot depicting a contacts view 500 according to one embodiment of the present invention and as may be presented on screen 102. In one embodiment, an on-screen item is highlighted 501 (for example, by displaying the item in reverse video), and the following buttons perform scrolling functions:

- scroll down button 103 moves highlight 501 down one item;
- scroll up button 104 moves highlight 501 up one item;
- holding scroll down button 103 or scroll up button 104 repeats the appropriate action at a predefined repeat rate;
- scroll down button 103 preceded by shift button 206 (or while shift button 206 is held down) moves down one page;
- scroll up button 104 preceded by shift button 206 (or while shift button 206 is held down) moves up one page;
- holding scroll down button 103 or scroll up button 104 preceded by shift button 206 (or while shift button 206 is held down) repeats the appropriate action at a predefined repeat rate;
- scroll down button 103 preceded by option button 205 (or while option button 205 is held down) moves down one category;
- scroll up button 104 preceded by option button 205 (or while option button 205 is held down) moves up one category;
- holding scroll down button 103 or scroll up button 104 preceded by option button 205 (or while option button 205 is held down) repeats the appropriate action at a predefined repeat rate;
- space bar 207 selects the highlighted item; and
- enter key 204 selects the highlighted item.

In one embodiment, device 100 also includes jog rocker controls (not shown) that perform the same functions as scroll up and scroll down buttons 104 and 103. Jog rocker control may also be pressed in to select the highlighted item.

In one embodiment, the user may move highlight 501 up and down by activating on-screen scroll arrows 502 and 503, respectively. In one embodiment, the user may select a displayed item by tapping it with a stylus or with a finger.

Once step 308 has been performed, the invention proceeds to step 309.

If in 307 filtered set 405 is empty, meaning that no directory records match the lookup string, the invention attempts 303 to convert the lookup string to a numeric dial string 404. In one embodiment, the conversion attempt 303 is performed by string handler 402, which may be a software module within device 100. Step 303 may be performed, for example, by forming a numeric sequence using secondary (numeric) values for the characters of lookup string 302. If one or more characters do not have numeric values, the invention determines that the string cannot be converted to a numeric dial string 404.

For example, given the keyboard 101 shown in FIG. 2, the lookup string "HYJJJJBUHH", can be converted to the numeric string "4155557844", since each character in the lookup string corresponds to a key 202 that has a numeric secondary value. However, the lookup string "MINSTREL" cannot be converted to a numeric string, since some of the characters do not correspond to keys 202 that have a numeric secondary value.

In one embodiment, some punctuation symbols are considered permissible as part of a telephone number, and therefore are treated as having a numeric secondary value. For example, the string "JJJFMYUI" can be converted to "555-9723", and could therefore be considered a valid telephone number. Similarly, the string "SUYIDJJJFYUIH" can be converted to "(213)555-1234", and could also be considered a valid telephone number. Accordingly, references to "numeric dial string" in the following descriptions can be considered to include those strings that contain punctuation or symbols that are appropriate for telephone numbers, as well as numeric characters themselves.

The invention determines 304 whether the lookup string was successfully converted to a numeric dial string 404. If so, the invention displays 305 numeric dial string 404, for example on display screen 102. In one embodiment, numeric dial string 404 is displayed in a portion of screen 102 that is used for dialing in progress.

If, in 304, the lookup string cannot be converted to a numeric dial string (for example, if the lookup string contains at least one character that does not correspond to a key 202 having a numeric secondary value), then the invention restores 316 the lookup string and display screen 102 to their previous state. Thus, the most recently entered keystroke is ignored, and display screen 102 remains unchanged. In one embodiment, the invention provides auditory feedback such as a beep, or visual feedback such as a dialog box, to inform the user that the keystroke was ignored.

In one embodiment, steps 303, 304, 306, and 307 are performed by string handler 402, which may be a software module within device 100.

If the user enters additional character input 309, the invention returns to step 301 to process the additional keystrokes. If the user indicates some other command (such as selecting a displayed record, or providing a "dial" command, or selecting another operation entirely), the appropriate action is performed 314 and the method ends 315. If appropriate, additional operations may take place. For example, if the user selects a displayed record, a directory lookup module 407 may obtain more detailed information from directory 403 for display (such as postal address, e-mail address, and the like). If the user indicates a "dial" command, either numeric dial string 404 or the telephone number associated with a selected directory record is provided to dialer 408. Dialer 408 may be a software module for initiating a dialing operation. Telephone 409, which may be an integrated module in device 100, may then be activated so as to allow the user to communicate with the called party.

In one embodiment, when the user presses backspace key 203, the most recently entered keystroke is deleted. The invention then continues with steps 306, 307, 308, 303, 304, 316, 305, 309, and 314 as described above.

Figure 3B:
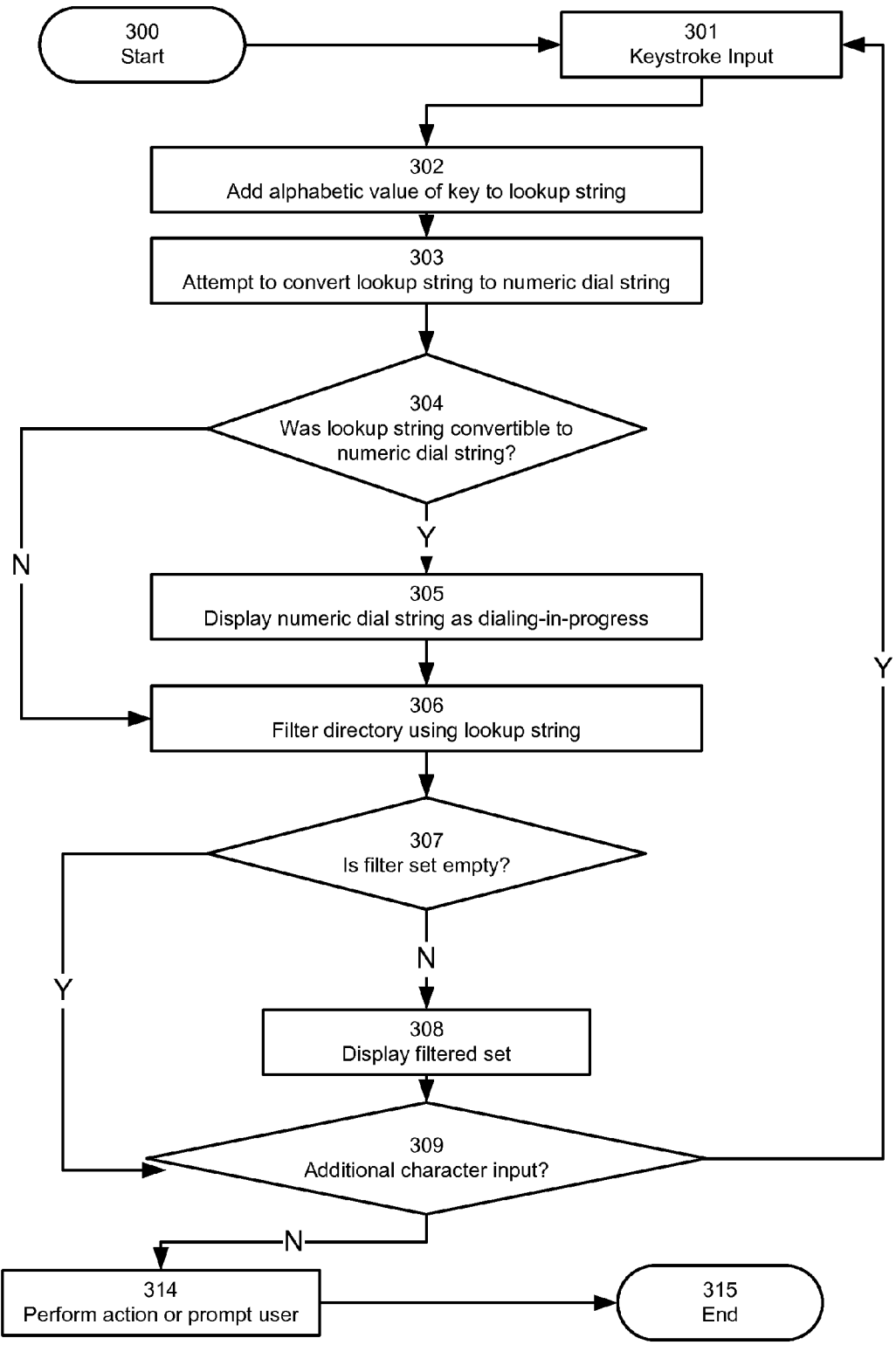
FIG. 3B is a flowchart depicting operation of the present invention according to another embodiment, where feedback for two operations is displayed concurrently when appropriate.
Figure 3C:
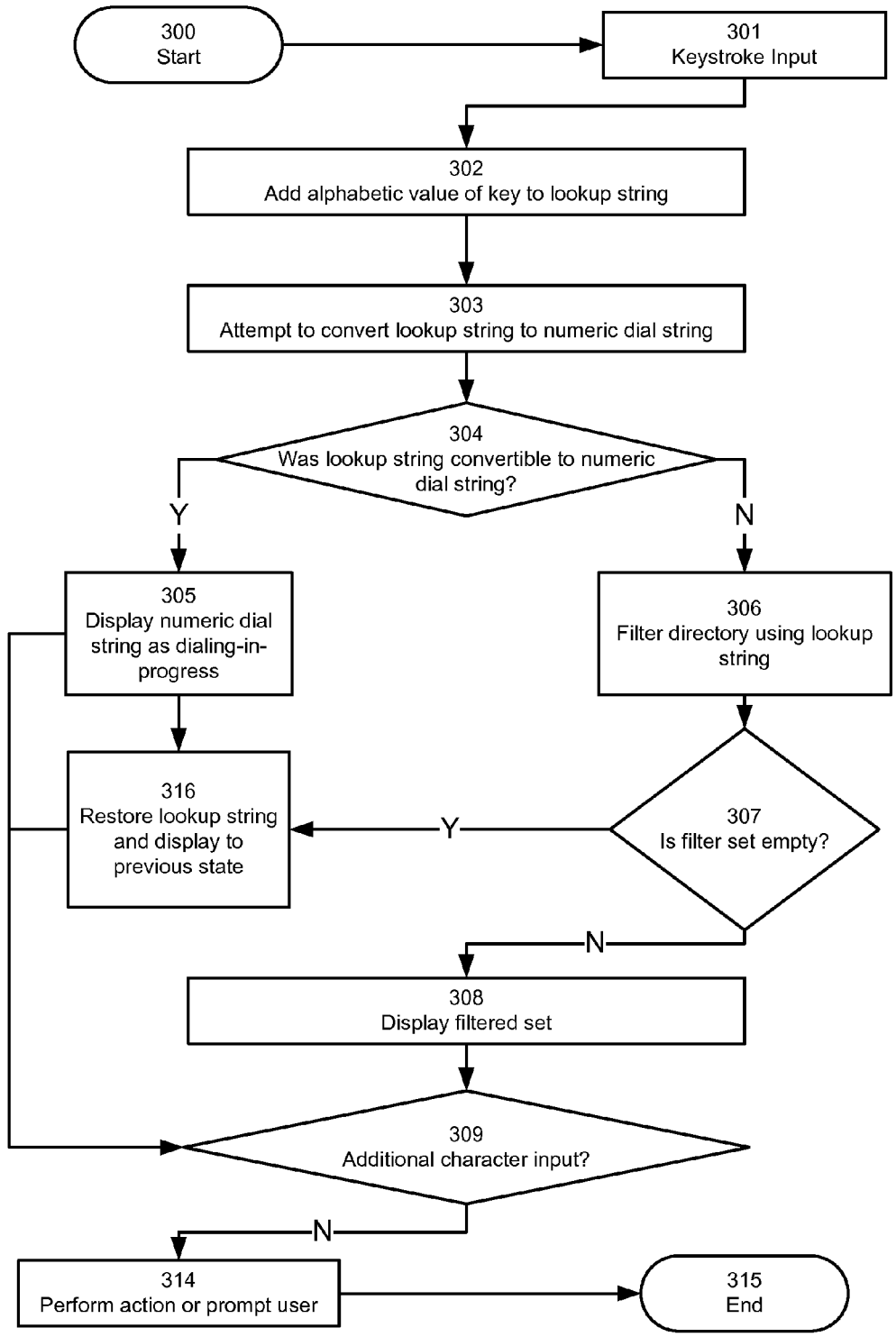
FIG. 3C is a flowchart depicting operation of the present invention according to one embodiment, where a direct-dial operation is initially assumed.

Referring now to FIG. 3C, there is shown a flowchart depicting operation of the present invention according to one embodiment, where a direct-dial operation is initially assumed. One skilled in the art will recognize that the flowchart of FIG. 3C is merely exemplary, and that other methods for implementing the invention may be used.

The user presses keys on keyboard 101 (or provides character input via some other character input device). Upon receipt of such keystroke input 301, the invention adds 302 the value of the pressed key to a stored lookup string. In one embodiment, the lookup string may be initialized as a null string prior to step 301. In one embodiment, step 302 and subsequent steps of FIG. 3C may be performed in response to each individual keystroke. In an alternative embodiment, the invention attempts to perform step 302 and subsequent steps of FIG. 3C in response to each keystroke, but if the user rapidly enters a sequence of key-strokes, the invention may wait until an appropriate pause in the sequence, or until a predetermined number of keystrokes are received, before proceeding with step 302 and subsequent steps of FIG. 3C. In another alternative embodiment, the invention performs step 302 and subsequent steps of FIG. 3C after completion of a keystroke sequence, or when the user pauses in entering keystrokes, or when the user enters a command specifying that the determination of operation should take place.

In one embodiment, the lookup string contains primary values of keys (such as alphabetic values, for example). In another embodiment, some coding mechanism is employed to indicate which keys are pressed, so that a coded string is formed that can later be decoded and interpreted as appropriate. If, when step 302 is to be performed, no lookup string yet exists, it may be initialized upon receipt of the first keystroke input 301. Alternatively, a null string may be initialized before commencing the method of FIG. 3C. Once a lookup string has been established, it is stored, for example, in buffer 401 or in any other mechanism for storing strings of data.

After the stored lookup string has been established or modified by the addition of a new keystroke value in step 302, the invention attempts 303 to convert the lookup string to a numeric dial string 404. As described above, in one embodiment, the conversion attempt 303 is performed by string handler 402.

The invention determines 304 whether the lookup string was successfully converted to a numeric dial string 404. If so, the invention displays 305 numeric dial string 404, for example on display screen 102, and proceeds to step 309. In one embodiment, numeric dial string 404 is displayed in a portion of screen 102 that is used for dialing in progress.

If, in 304, the lookup string cannot be converted to a numeric dial string (for example, if the lookup string contains at least one character that does not correspond to a key 202 having a numeric secondary value), then the invention performs a filtering operation 306 on stored directory 403, using the lookup string, to obtain a filtered directory set 405.

The invention determines 307 whether the filtering operation yielded any results. If the filtered set 405 is not empty, meaning that at least one directory record matches the lookup string, the filtered set 405 is displayed 308 on screen 102.

If filtered set 405 is empty, meaning that no directory records match the lookup string, the invention restores 316 the lookup string and display screen 102 to their previous state. Thus, the most recently entered keystroke is ignored, and display screen 102 remains unchanged. In one embodiment, the invention provides auditory feedback such as a beep, or visual feedback such as a dialog box, to inform the user that the keystroke was ignored.

In one embodiment, steps 303, 304, 306, and 307 are performed by string handler 402, which may be a software module within device 100.

If the user enters additional character input 309, the invention returns to step 301 to process the additional keystrokes. If the user indicates some other command (such as selecting a displayed record, or providing a "dial" command, or selecting another operation entirely), the appropriate action is performed 314 and the method ends 315. If appropriate, additional operations may take place. For example, if the user selects a displayed record, a directory lookup module 407 may obtain more detailed information from directory 403 for display (such as postal address, e-mail address, and the like). If the user indicates a "dial" command, either numeric dial string 404 or the telephone number associated with a selected directory record is provided to dialer 408. Dialer 408 may be a software module for initiating a dialing operation. Telephone 409, which may be an integrated module in device 100, may then be activated so as to allow the user to communicate with the called party.

In one embodiment, when the user presses backspace key 203, the most recently entered keystroke is deleted. The invention then continues with steps 303, 304, 305, 306, 307, 316, 308, 309, and 314 as described above.

Referring now to FIG. 3B, there is shown a flowchart depicting operation of the present invention according to another embodiment, where feedback for two operations is displayed concurrently when appropriate.

The user presses keys on keyboard 101 (or provides character input via some other character input device). Upon receipt of such keystroke input 301, the invention adds 302 the value of the pressed key to a stored lookup string. In one embodiment, the lookup string may be initialized as a null string prior to step 301. In one embodiment, step 302 and subsequent steps of FIG. 3B may be performed in response to each individual keystroke. In an alternative embodiment, the invention attempts to perform step 302 and subsequent steps of FIG. 3B in response to each keystroke, but if the user rapidly enters a sequence of key-strokes, the invention may wait until an appropriate pause in the sequence, or until a predetermined number of keystrokes are received, before proceeding with step 302 and subsequent steps of FIG. 3B. In another alternative embodiment, the invention performs step 302 and subsequent steps of FIG. 3B after completion of a keystroke sequence, or when the user pauses in entering keystrokes, or when the user enters a command specifying that the determination of operation should take place.

In one embodiment, the lookup string contains primary values of keys (such as alphabetic values, for example). In another embodiment, some coding mechanism is employed to indicate which keys are pressed, so that a coded string is formed that can later be decoded and interpreted as appropriate. If, when step 302 is to be performed, no lookup string yet exists, it may be initialized upon receipt of the first keystroke input 301. Alternatively, a null string may be initialized before commencing the method of FIG. 3B. Once a lookup string has been established, it is stored, for example, in buffer 401 or in any other mechanism for storing strings of data.

After the stored lookup string has been established or modified by the addition of a new keystroke value in step 302, the invention attempts 303 to convert the lookup string to a numeric dial string 404.

The invention determines 304 whether the lookup string was successfully converted to a numeric dial string 404. If so, the invention displays 305 numeric dial string 404, for example on display screen 102. In one embodiment, numeric dial string 404 is displayed in a portion of screen 102 that is used for dialing in progress. As will be described in more detail below, a user interface may be provided which contains such a screen portion for providing dialing feedback, while another screen portion is concurrently used for directory lookup feedback. Thus, the user can perform either a direct-dial operation or a directory filtering operation, and receive appropriate feedback for the operation being performed, without having to specify in advance which operation is desired.

If, in 304, the lookup string cannot be converted to a numeric dial string (for example, if the lookup string contains at least one character that does not correspond to a key 202 having a numeric secondary value), then no numeric dial string is displayed. In one embodiment, the corresponding portion of screen 102 is left blank, and any previously displayed numeric dial string is deleted; in another embodiment, an indicator is displayed to inform the user that the direct-dial operation is no longer active. Auditory or other feedback may also be provided to indicate that direct-dial is no longer active.

The invention performs a filtering operation 306 on a stored directory 403, using the lookup string, to obtain a filtered directory set 405.

The invention determines 307 whether the filtering operation yielded any results. If the filtered set 405 is not empty, meaning that at least one directory record matches the lookup string, the filtered set 405 is displayed 308 on screen 102.

If filtered set 405 is empty, meaning that no directory records match the lookup string, the invention may leave the corresponding area of screen 102 blank, or may display feedback indicating that no records match. Auditory or other feedback may also be provided to indicate that no records match. In one embodiment, auditory or other feedback may be provided when direct-dial is not active (because at least one entered keystroke has no numeric secondary value) and no records match the lookup string. The user is thereby notified that his or her keystroke entry has thus far yielded no valid results according to either direct-dialing or directory filtering. The user may thereby be encouraged to backspace so as to delete the most recently typed keystroke, as described below.

In one embodiment, steps 303, 304, 306, and 307 are performed by string handler 402, which may be a software module within device 100.

If the user enters additional character input 309, the invention returns to step 301 to process the additional keystrokes. If the user indicates some other command (such as selecting a displayed record, or providing a "dial" command, or selecting another operation entirely), the appropriate action is performed 314 and the method ends 315. If appropriate, additional operations may take place. For example, if the user selects a displayed record, a directory lookup module 407 may obtain more detailed information from directory 403 for display (such as postal address, e-mail address, and the like). If the user indicates a "dial" command, either numeric dial string 404 or the telephone number associated with a selected directory record is provided to dialer 408. Dialer 408 may be a software module for initiating a dialing operation. Telephone 409, which may be an integrated module in device 100, may then be activated so as to allow the user to communicate with the called party.

In one embodiment, when the user presses backspace key 203, the most recently entered keystroke is deleted. The invention then continues with steps 303 through 314 as described above. Since pressing backspace key 203 shortens the lookup string, in general such an action may enlarge the filtered set, and/or may reactivate the direct-dial operation where it may previously have been rendered inactive by entry of a keystroke having no numeric secondary value. In other words, the user may delete those keystrokes that have no numeric secondary value and thereby reactivate the direct-dial operation.

Thus, the present invention allows a user to enter keystrokes corresponding to a direct-dial operation, or corresponding to a directory filtering operation, where some or all of the keystrokes correspond to multiple-value keys, without having to specify which operation is intended. The invention determines which operation is intended based on whether the user enters any non-numeric keystrokes and/or on whether the directory, when filtered according to the entered keystrokes, yields any records. As described above, the invention makes the aforementioned determinations after each keystroke, or after a series of keystrokes, so that the filtering process is iterative.

In one embodiment, the user may override the invention's determination, or may manually specify which operation is desired, or may manually specify a mode of operation. Such specification may be made before, during, or after entry of the keystrokes. Thus, for example, the user might be given the opportunity to specify that a direct-dial operation is intended by tapping screen 102 in a location where the direct-dial number is displayed. Thereafter, during the current direct-dial operation, subsequent keystrokes are interpreted as numeric. If a key having no numeric secondary value is pressed, the invention may ignore the keystroke or may provide auditory or other feedback to indicate that the keystroke is not accepted.

In one embodiment, the user may enter numeric characters as part of the lookup string (for example, if the company name contains a numeric character, such as "3Com"). A "numlock" mode may be provided, as is known in the art, for entering numeric characters in this manner. The user may enter such a mode by pressing option key 205 before pressing key 202 having a numeric secondary value. The numeric value (rather than the alphabetic value) of the pressed key 202 will then be added to the lookup string. In another embodiment, the invention performs the filtering operation using all possible combinations of primary and secondary values for lookup string keystrokes. Thus, a lookup string of "ICOM" would match directory entries having relevant fields containing "ICOM", "3COM", "ICO9", and any other combination of primary and secondary values for the entered keystrokes.

In an alternative embodiment, keys may be associated with other values besides the primary and secondary values. For example, the "E" key may be associated with other values similar to or related to "E", such as "e", "ê" and "è". Individual characters in the lookup string are considered to match these other values. Thus, a lookup string of "BET" would match "B ê te". The other values may or may not appear on the keyboard itself. In addition, the other values may be associated with keys 201 having non-numeric secondary values, keys 202 having numeric secondary values, and/or keys having no secondary values (not shown).

In an alternative embodiment, in performing the directory filter step 306, in addition to identifying directory records having fields that match the lookup string, the invention also identifies directory records having a telephone number that matches numeric dial string 404 (if such a string is valid and available). Thus, filtered directory set 405 includes records that contain matching telephone numbers as well as matching names (or other fields). The user can thereby enter the first few digits of a telephone number and, if the corresponding directory record exists within directory 403, the user may select the desired record from a displayed list of records having a telephone number that matches the entered digits. The user can select the desired record and dial the associated number without having to enter the rest of the number.

In another embodiment, if filtered directory set 405 is reduced to one record, the invention may automatically select that record for retrieval, or for dialing, or for some other operation. Alternatively, the user interface of the invention may provide an "auto-fill" function whereby the remainder of the name (or other field) is automatically filled in on behalf of the user, once a particular record can be identified from the user's input. Techniques of "auto-filling" in this manner are well known in the art.

In one embodiment, the user may override the invention's determination as to whether a directory filtering operation or a direct-dial operation is intended. The invention may provide a preference screen for selecting which operation is active. Alternatively, a command may be available for manually specifying which operation is intended, or which mode of operation is desired. Such specification may be made before, during, or after entry of the keystrokes.

In one embodiment, feedback for each of the possible operations is displayed, or is not displayed, according to user preferences or other considerations. Thus, where such feedback might confuse the user, the invention may avoid such confusion. For example, the user may specify in a preference screen that dial strings are to be displayed in a different color, style, or font than directory filter results. One skilled in the art will recognize that other options for configuring or personalizing the operation of the invention may be contemplated.

Multiple-Field Filtering

In one embodiment, the invention filters directory records concurrently based on multiple fields. With each keystroke, all non-matching records are filtered out, and matches are displayed (although if there are more matches than can fit on screen 102, scrolling is enabled to allow navigation among matching records). The lookup string is applied to several fields concurrently, so that the filter results include all records for which any of the several fields matches the lookup string. Particular fields may be designated as searchable, so that the lookup string is applied to those fields but not other fields. Field combinations and/or derived fields may also be designated, such as for example: first initial plus last name (a derived field), or first name plus last name (a field combination). Derived fields are fields that can be generated by performing an operation on one or more other fields. Combination fields are fields that can be generated by combining two or more other fields. Derived fields and combination fields need not be stored in directory 403, but may be generated "on the fly" as needed. One skilled in the art will recognize that the invention may perform searches on any combination of stored fields, derived fields, combination fields, and the like.

In one embodiment, the invention filters the lookup string against the following fields:

- first name (for example, lookup string "GR" would match "Greg Shirai");
- last name (for example, lookup string "GR" would also match "Bob Green");
- derived field: first initial and last initial (for example, lookup string "GR" would also match "Gus Rollins");
- derived field: first initial and last name (for example, lookup string "GRA" would match "Gary Randolph");
- field combination: first name and last name if a space is entered between them (for example, lookup string "GR RA", which includes a space after the second character, would match "Greg Ralston"); and
- company name.

One skilled in the art will recognize that other fields, field combinations, or derived fields could also be used.

In addition, as discussed above, characters within the lookup string may match similar or related values in directory record fields. Thus, for example, lookup string "RBE" would match "Robert B ê te", since the "E" matches the "ê".

In one embodiment, spaces (or other punctuation) within a name are ignored, for pattern matching purposes. Thus, "TVONBR" would match "Tom von Bridgwater", where "von" is part of the last name and not a middle name. Similarly, "ELM" would match "Jane El-Makim", since the hyphen would be ignored. "EL-M" would also match "Jane El-Makim", should the user elect to include the hyphen in the lookup string.

As described above, if the user backspaces so as to delete the last character, the filter results revert to those shown before the last character was entered.

In one embodiment of the invention, multiple-field filtering is provided without automatically determining whether the user intends a directory filter or direct-dial operation. In another embodiment, multiple-field filtering is combined with automatic determination as to whether the user intends a directory filter or direct-dial operation.

Examples of User Interface

Referring now to FIGS. 8A through 8E, there are shown screen shots depicting an example of a directory filtering operation according to one embodiment of the present invention where a directory filtering operation is initially assumed. The screen shots of FIGS. 8A through 8E correspond to the method described above in connection with FIG. 3A. In the example shown, the user is attempting to look up John Birch's number in the directory in order to call him on his work telephone number.

Figure 8A:
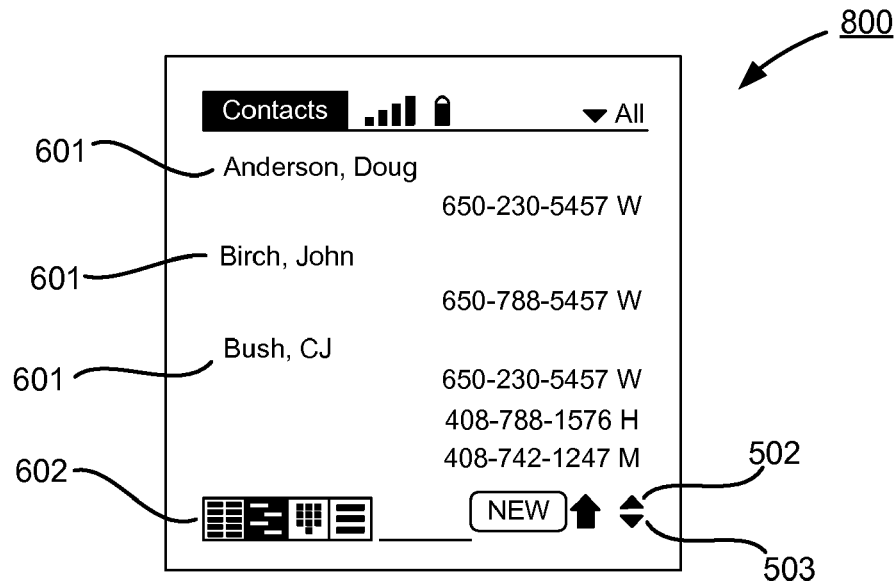
FIGS. 8A through 8E are screen shots depicting an example of a directory lookup operation according to one embodiment of the present invention, where a directory filtering operation is initially assumed.

Referring now to FIG. 8A, initial contact screen 800 is shown. Screen 800 may be activated, for example, by simply turning on device 100, or by entering a mode for directory lookup, or by activating a phone application. Screen 800 includes a number of contact records 601, scroll arrows 502 and 503 for navigating to additional records, and on-screen controls 602 for activating other functions of device 100.

Figure 8B:
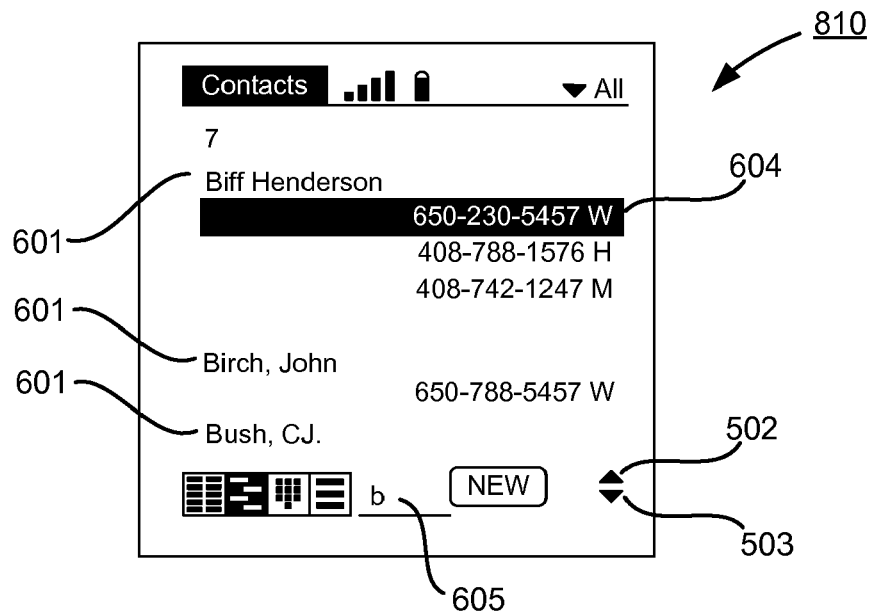

In one embodiment, screen 800 may be skipped entirely, so that the invention proceeds directly to screen 810, depicted in FIG. 8B, in response to the user entering a keystroke.

Since the user is attempting to look up "Birch, John", he or she first presses the "B" key. At this point, screen 810 is displayed, as depicted in FIG. 8B. Screen 810 shows the results of a filtering operation on the directory using the letter "B", and therefore includes records from the directory that begin with the letter "B". Additional records that begin with "B" may be available, and may be accessed by scrolling. The filter is applied to multiple fields, so that the displayed records include those having a first name beginning with "B" (Biff Henderson), as well as those having a last name beginning with "B" (John Birch, CJ Bush). In one embodiment, records having a company name, or initials, or other relevant field that begins with "B" would also be displayed. The first telephone number in the first displayed record is selected (as indicated by highlight 604), although in alternative embodiments a different record might be selected.

Screen 810 also includes lookup string field 605 that displays the lookup string, consisting of the characters entered thus far. Accordingly, a "b" is currently displayed, indicating that the user has entered the letter "B". As the user enters additional characters, field 605 helps to remind the user of the criteria on which the directory is being filtered, and also reduces user confusion when he or she backspaces and types additional characters. One skilled in the art will recognize that lookup string field 605 is not required, and the set of displayed contact records 601 may offer sufficient feedback to the user. Accordingly, in an alternative embodiment, lookup string field 605 is not displayed, or the display of lookup string field 605 is configurable by the user.

Figure 8C:
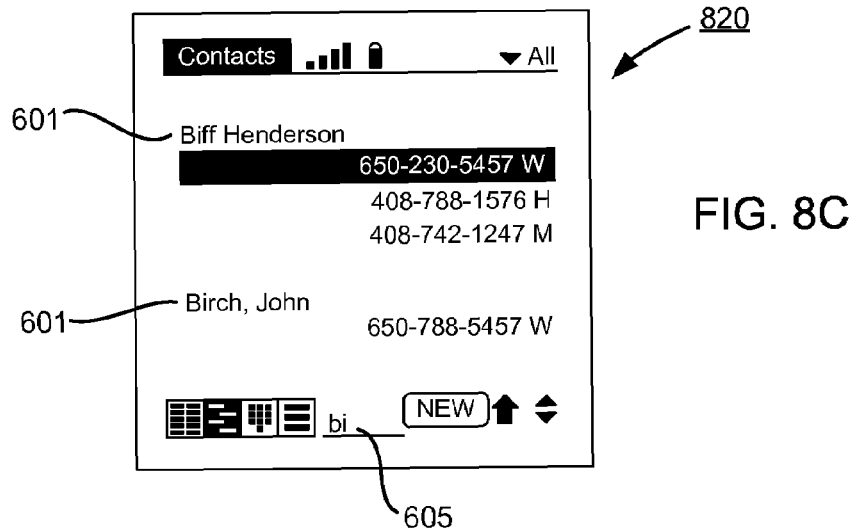

Still attempting to zero in on "Birch, John", the user now presses the "I" key. At this point, screen 820 is displayed, as depicted in FIG. 8C. Screen 820 shows the results of the filtering operation on the directory using the lookup string "BI", and therefore now includes records that begin with "BI". Again, additional records that begin with "BI" may be accessible via scrolling. Now, two records are displayed: Biff Henderson (since the first name begins with "BI") and John Birch (since the last name begins with "BI"). Lookup string field 605 now shows "bi".

Figure 8D:
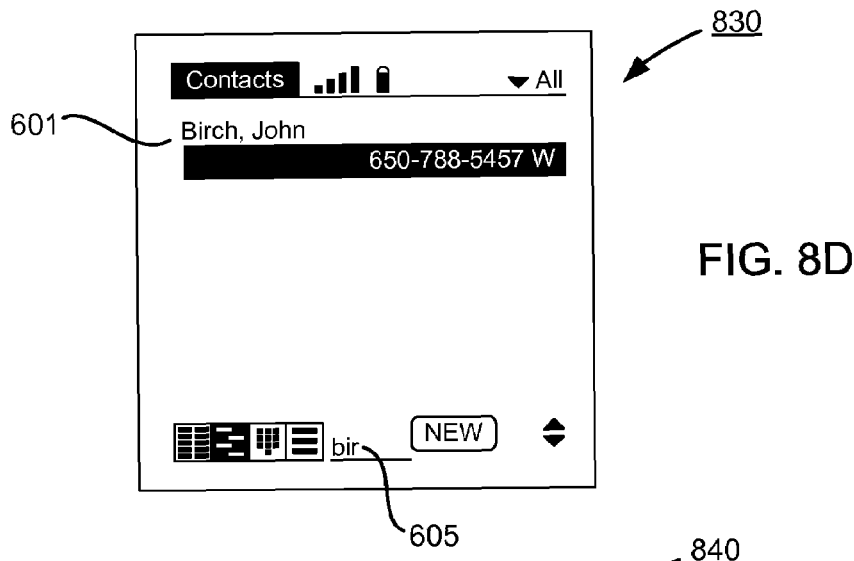

Next, the user presses the "R" key. At this point, screen 630 is displayed, as depicted in FIG. 8D. Screen 630 shows the results of the filtering operation on the directory using the lookup string "BIR", and therefore now includes records that begin with "BIR". Again, additional records that begin with "BIR" may be accessible via scrolling. However, in the example shown, only one record matches the filter: John Birch. Thus, John Birch's first listed telephone number is now highlighted 601. Lookup string field 605 now shows "bir".

Now that the user has successfully pinpointed the record he or she was interested in, he or she presses space bar 207 or enter key 204 to dial the highlighted number 601. Alternatively, the user may tap the number on the screen (with a stylus or finger), or may press a jog rocker control (not shown).

Figure 8E:
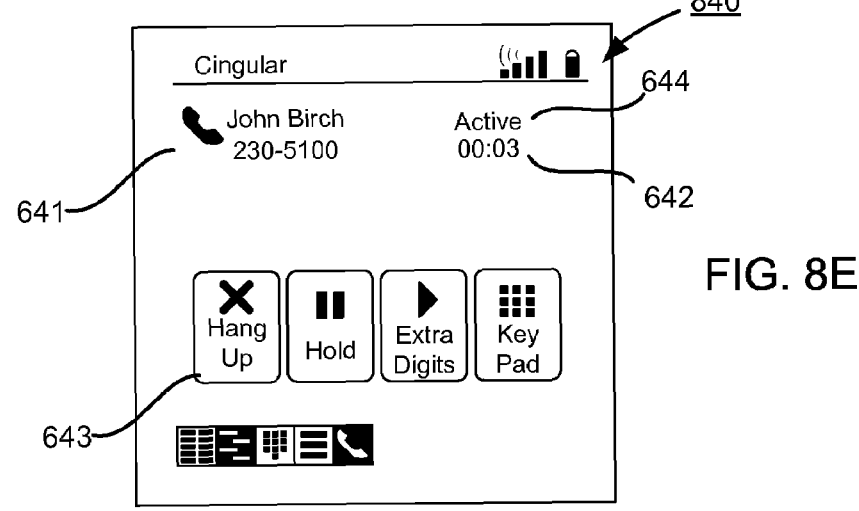

Referring now to FIG. 8E, there is shown screen 640, which contain various user interface elements that are relevant to a call in progress. The name and number of the called party are displayed 641, as well as an indication that the call is active 644 and a call timer 642. Additional controls 643 are provided, for operations such as hang up, hold, extra digits, or keypad.

Referring now to FIGS. 9A through 9D, there are shown screen shots depicting an example of a direct-dial operation according to one embodiment of the present invention, where a directory filtering operation is initially assumed. The screen shots of FIGS. 9A through 9D correspond to the method described above in connection with FIG. 3A. In the example shown, the user is attempting to dial the number 730-788-5457.

Figure 9A:
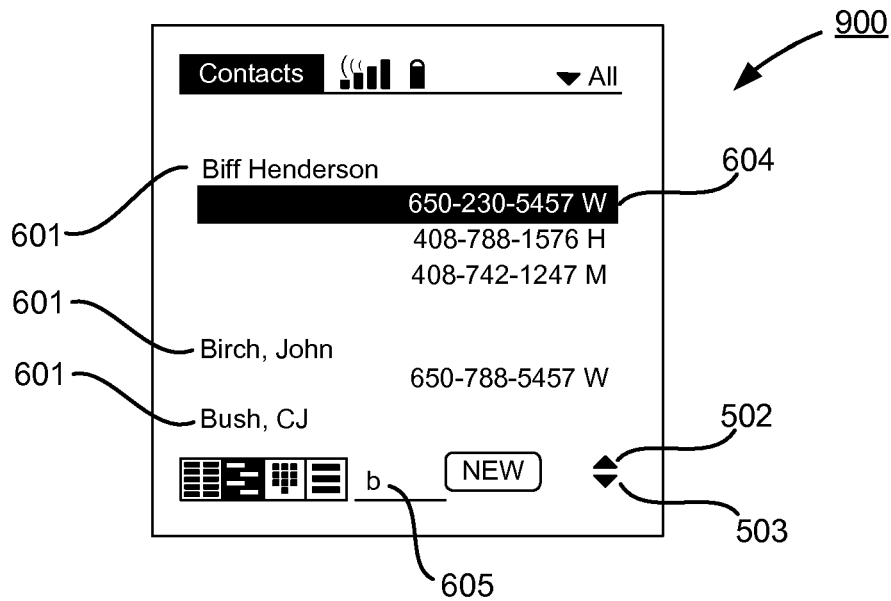
FIGS. 9A through 9D are screen shots depicting an example of a direct-dial operation according to one embodiment of the present invention, where a directory filtering operation is initially assumed.

Since the user is attempting to dial 730-788-5457 he or she first presses the key having a numeric secondary value of "7". At this point, screen 900 is displayed, as depicted in FIG. 9A. Since the primary value of the "7" key is the letter "B", screen 900 shows the results of a filtering operation on the directory using the letter "B", including records from the directory that begin with the letter "B". Additional records that begin with "B" may be available, and may be accessed by scrolling. The filter is applied to multiple fields, so that the displayed records include those having a first name beginning with "B" (Biff Henderson), as well as those having a last name beginning with "B" (John Birch, CJ Bush). In one embodiment, records having a company name, or initials, or other relevant field that begins with "B" would also be displayed. The first telephone number in the first displayed record is selected (as indicated by highlight 604), although in alternative embodiments other records might be selected. Screen 900 also includes lookup string field 605 that displays the lookup string, consisting of the primary values for the keystrokes entered thus far. Accordingly, a "b" is currently displayed, indicating that the user has entered the letter "B". Again, in an alternative embodiment, lookup string field 605 is not displayed, or the display of lookup string field 605 is configurable by the user.

At this point the invention cannot determine whether the user is attempting to look up a directory record or direct-dialing a telephone number. In fact, the behavior of the user at this point is identical to the behavior of the user in the previous example prior to the display of screen 810, since in both cases the "B" key (having a secondary value of "7") was pressed. Thus, screen 900 is identical to screen 810.

Figure 9B:
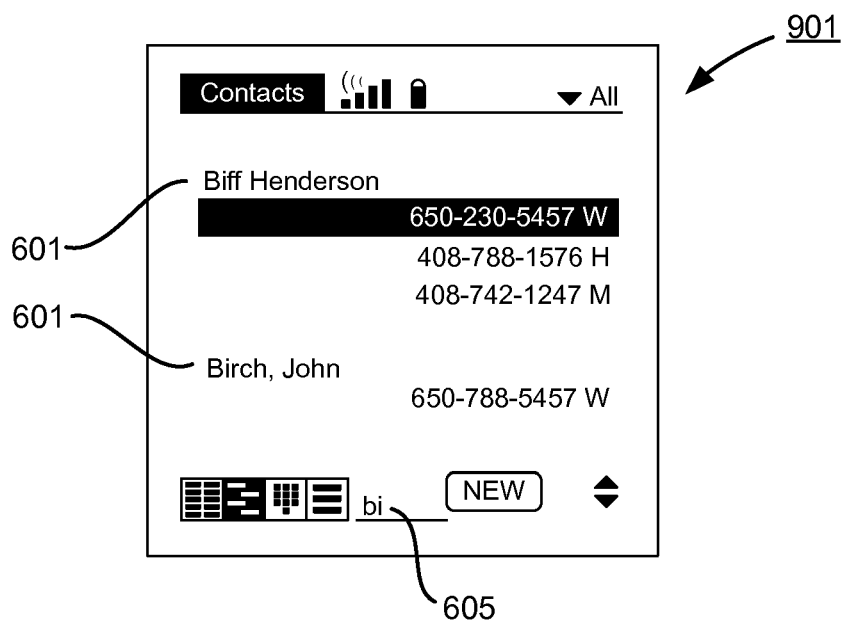

Continuing to dial the number, the user presses the key having a numeric secondary value of "3". At this point, screen 901 is displayed, as depicted in FIG. 9B.

Since the primary value of the "3" key is the letter "I", screen 900 shows the results of a filtering operation on the directory using the lookup string "BI", including records from the directory that begin with the letters "BI". Again, additional records that begin with "BI" may be accessible via scrolling. Now, two records are displayed: Biff Henderson (since the first name begins with "BI") and John Birch (since the last name begins with "BI"). Lookup string field 605 now shows "bi".

Since the invention still cannot determine whether the user is performing directory lookup or direct-dial, feedback appropriate to directory lookup is still displayed. In fact, the behavior of the user at this point is identical to the behavior of the user in the previous example prior to the display of screen 820, since in both cases the "B" key and the "I" key (having secondary values of "7" and "3", respectively) were pressed. Thus, screen 901 is identical to screen 820.

Figure 9C:
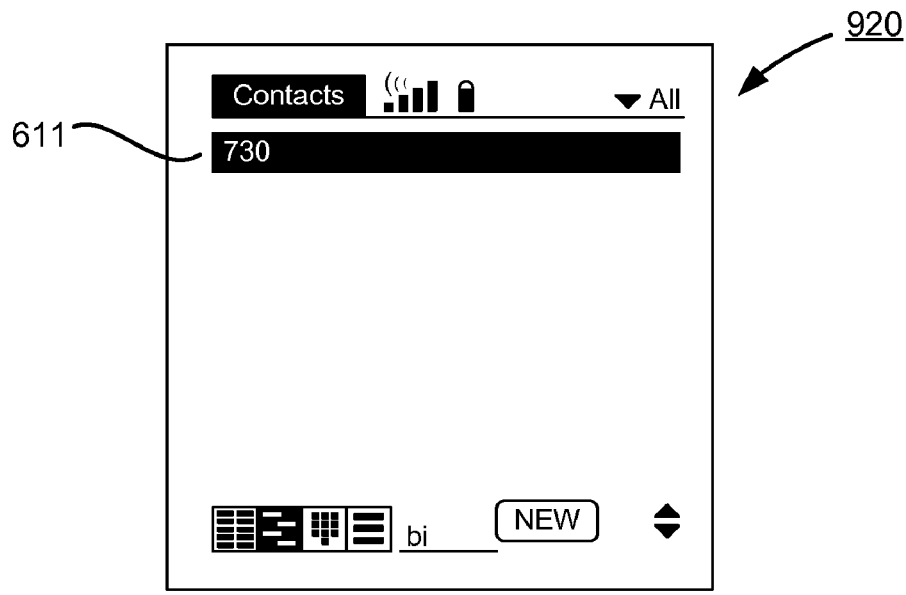

Next, the user presses the key having a numeric secondary value of "0". At this point, screen 920 is displayed, as depicted in FIG. 9C. Dial string 611 is now displayed, and now reads "730", corresponding to the numeric values of the three keys thus far entered. Directory filtering feedback is no longer displayed.

The primary value of the "0" key is a symbol, which has special meaning when entering text. It is used for accessing special symbols that are not displayed on the keyboard. No records in the database begin with the string "BI" followed by a special symbol. Thus, the filtering operation on this lookup string yields no results, and no records are now displayed. The invention can now infer that the user is direct-dialing a number, since all the entered keystrokes have numeric values and the lookup string yields no results. Accordingly, dial string 611 is now highlighted to indicate that it is the only valid operation. However, if the user were to now press backspace key 203 at this point, deleting the "0", the lookup string would revert to "BI" and screen 901 would again be displayed.

Figure 9D:
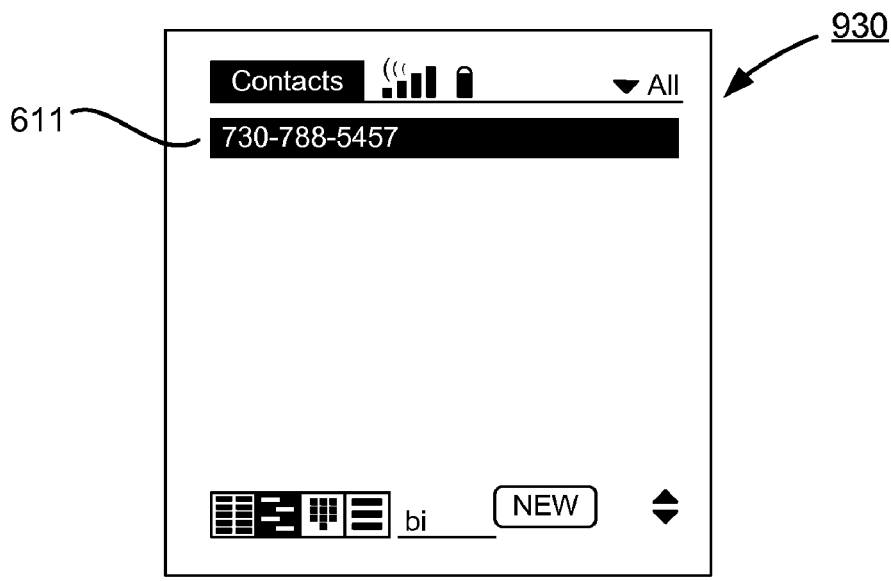

At this point, the user simply enters the remaining digits in the number being dialed. Referring now to FIG. 9D, there is shown display screen 930 after the user has completed entry of a ten-digit telephone number. Hyphens in dial string 611 may be added automatically, according to standard telephone number syntax. Once the user has finished entering the number, he or she presses space bar 207 or enter key 204 to dial the number. Alternatively, the user may tap the number on the screen (with a stylus or finger), or may press a jog rocker control (not shown).

In one embodiment, once the invention has reached a state where no records match the lookup string (e.g. screen 920), non-numeric keystrokes are rejected. Thus, if the user presses a key that does not have a numeric value, the invention may ignore the keystroke, or may provide feedback (such as a beep, for example) indicating that the entry is invalid.

Referring now to FIGS. 6A through 6E, there are shown screen shots depicting an example of a directory filtering operation according to one embodiment of the present invention, where feedback for two operations is displayed concurrently when appropriate. The screen shots of FIGS. 6A through 6E correspond to the method described above in connection with FIG. 3B. In the example shown, the user is attempting to look up John Birch's number in the directory in order to call him on his work telephone number.

Figure 6A:
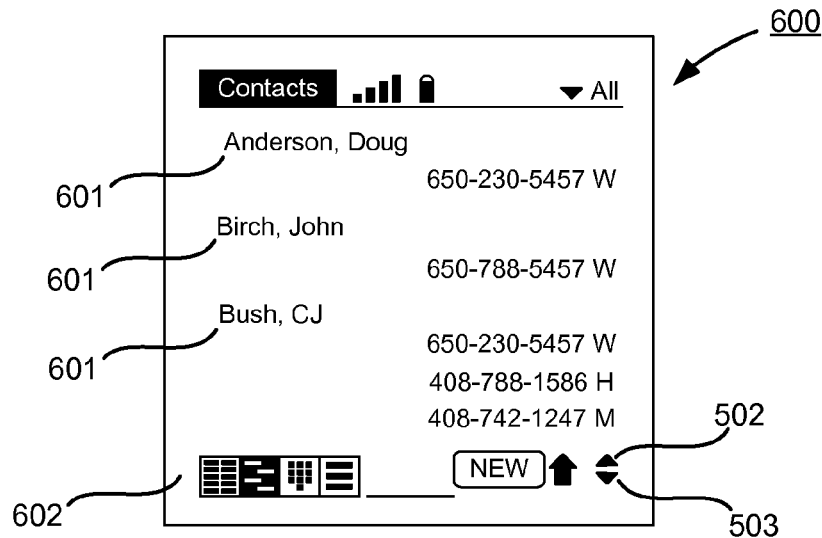
FIGS. 6A through 6E are screen shots depicting an example of a directory lookup operation according to one embodiment of the present invention, where feedback for two operations is displayed concurrently when appropriate.

Referring now to FIG. 6A, initial contact screen 600 is shown. Screen 600 may be activated, for example, by simply turning on device 100, or by entering a mode for directory lookup, or by activating a phone application. Screen 600 includes a number of contact records 601, scroll arrows 502 and 503 for navigating to additional records, and on-screen controls 602 for activating other functions of device 100.

Figure 6B:
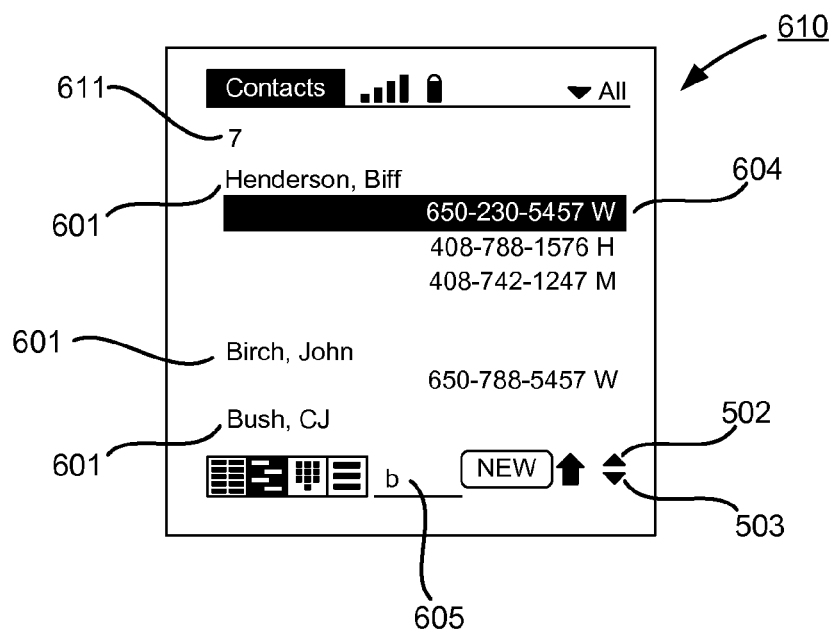

In one embodiment, screen 600 may be skipped entirely, so that the invention proceeds directly to screen 610, depicted in FIG. 6B, in response to the user entering a keystroke.

Since the user is attempting to look up "Birch, John", he or she first presses the "B" key. At this point, screen 610 is displayed, as depicted in FIG. 6B. Screen 610 shows the results of a filtering operation on the directory using the letter "B", and therefore includes records from the directory that begin with the letter "B". Additional records that begin with "B" may be available, and may be accessed by scrolling. The filter is applied to multiple fields, so that the displayed records include those having a first name beginning with "B" (Biff Henderson), as well as those having a last name beginning with "B" (John Birch, CJ Bush). In one embodiment, records having a company name, or initials, or other relevant field that begins with "B" would also be displayed. The first telephone number in the first displayed record is selected (as indicated by highlight 604), although in alternative embodiments a different record might be selected.

Screen 610 also includes lookup string field 605 that displays the lookup string, consisting of the characters entered thus far. Accordingly, a "b" is currently displayed, indicating that the user has entered the letter "B". As the user enters additional characters, field 605 helps to remind the user of the criteria on which the directory is being filtered, and also reduces user confusion when he or she backspaces and types additional characters. Again, in an alternative embodiment, lookup string field 605 is not displayed, or the display of lookup string field 605 is configurable by the user.

Screen 610 also displays dial string 611. The "B" key has a numeric secondary value of "7". Thus, at this point the invention cannot determine whether the user is attempting to look up a directory record or direct-dialing a telephone number. Accordingly, in addition to displaying filtered directory records, screen 610 also displays the number "7" as part of dial string 611. If the user is in fact direct-dialing a number, he or she will regard the display of dial string 611 as feedback in response to his or her keystrokes. Conversely, if the user is attempting directory lookup, he or she will regard lookup string field 605, along with the filtered result records 601, as feedback in response to keystrokes. By providing both forms of feedback concurrently, the invention allows the user to proceed with assurance that his or her actions are being correctly interpreted, despite the fact that neither of the two modes (directory lookup or direct-dial) has been explicitly specified.

In one embodiment, dial string 611 is displayed in a different font or visual style than is used for directory records, so as to indicate to the user that dial string 611 is not representative of a matching record.

Figure 6C:
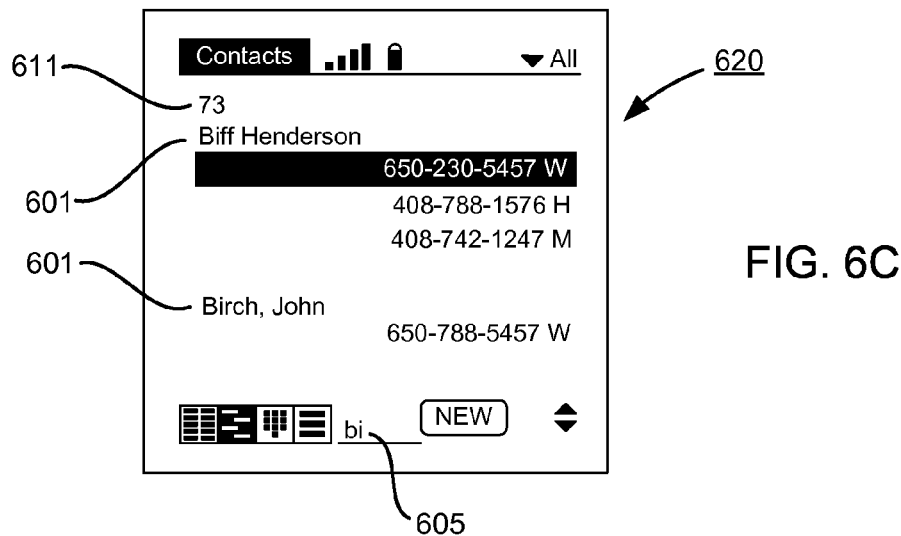

Still attempting to zero in on "Birch, John", the user now presses the "I" key. At this point, screen 620 is displayed, as depicted in FIG. 6C. Screen 620 shows the results of the filtering operation on the directory using the lookup string "BI", and therefore now includes records that begin with "BI". Again, additional records that begin with "BI" may be accessible via scrolling. Now, two records are displayed: Biff Henderson (since the first name begins with "BI") and John Birch (since the last name begins with "BI"). Lookup string field 605 now shows "bi". Dial string 611 is displayed as well, and now reads "73", since the "I" key has a numeric secondary value of "3". Since the invention still cannot determine whether the user is performing directory lookup or direct-dial, both forms of feedback are still displayed.

Figure 6D:
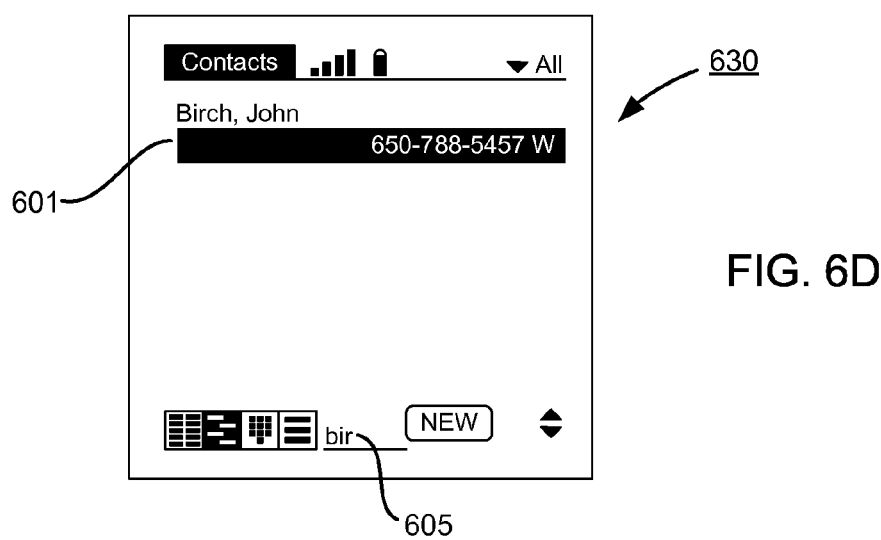

Next, the user presses the "R" key. At this point, screen 630 is displayed, as depicted in FIG. 6D. Screen 630 shows the results of the filtering operation on the directory using the lookup string "BIR", and therefore now includes records that begin with "BIR". Again, additional records that begin with "BIR" may be accessible via scrolling. However, in the example shown, only one record matches the filter: John Birch. Thus, John Birch's first listed telephone number is now highlighted 601. Lookup string field 605 now shows "bir". Since the "R" key does not have a numeric secondary value, the invention can now infer that the user is not direct-dialing a number, and therefore dial string 611 is no longer displayed. However, if the user were to now press backspace key 203, deleting the "R", the state of the display would revert to screen 620, depicted in FIG. 6C.

Now that the user has successfully pinpointed the record he or she was interested in, he or she presses space bar 207 or enter key 204 to dial the highlighted number 601. Alternatively, the user may tap the number on the screen (with a stylus or finger), or may press a jog rocker control (not shown).

Figure 6E:
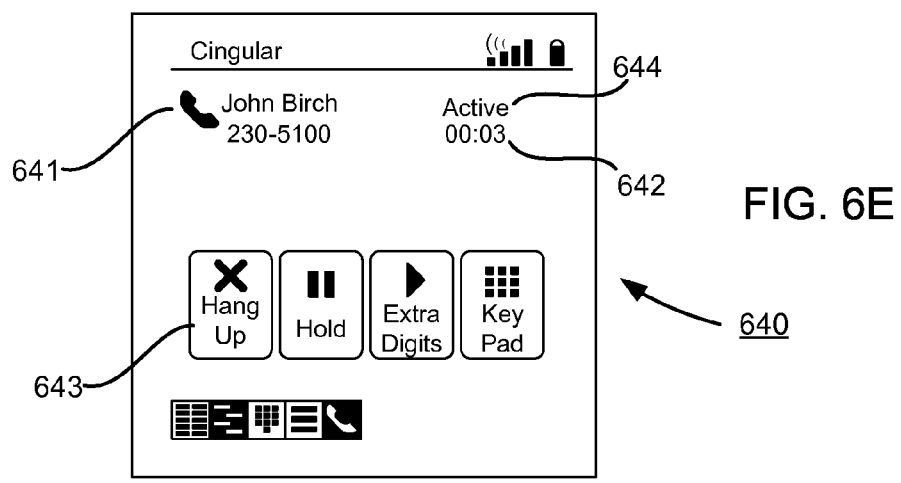

Referring now to FIG. 6E, there is shown screen 640, which contain various user interface elements that are relevant to a call in progress. The name and number of the called party are displayed 641, as well as an indication that the call is active 644 and a call timer 642. Additional controls 643 are provided, for operations such as hang up, hold, extra digits, or keypad.

Referring now to FIGS. 7A through 7D, there are shown screen shots depicting an example of a direct-dial operation according to one embodiment of the present invention, where feedback for two operations is displayed concurrently when appropriate. The screen shots of FIGS. 7A through 7D correspond to the method described above in connection with FIG. 3B. In the example shown, the user is attempting to dial the number 730-788-5457.

Figure 7A:
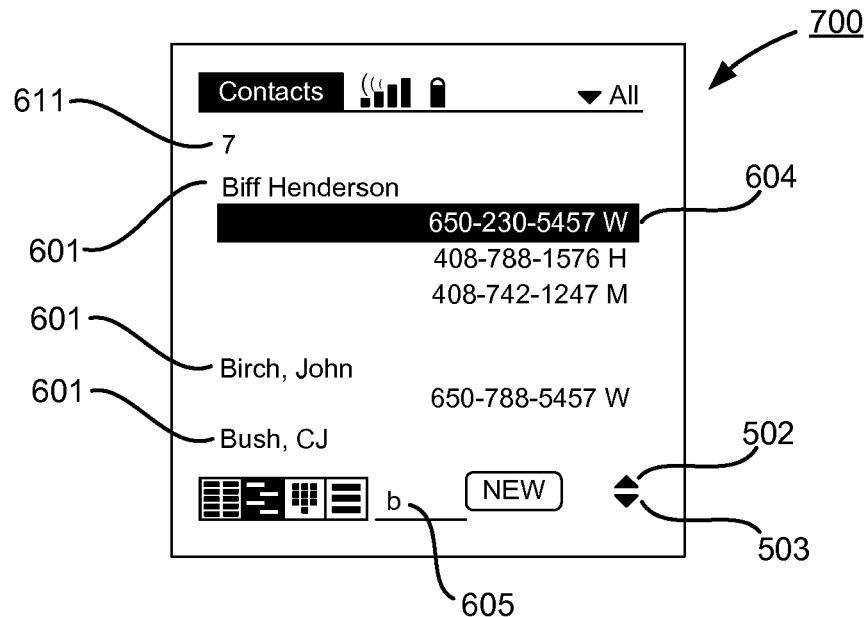
FIGS. 7A through 7D are screen shots depicting an example of a direct-dial operation according to one embodiment of the present invention, where feedback for two operations is displayed concurrently when appropriate.

Since the user is attempting to dial 730-788-5457 he or she first presses the key having a numeric secondary value of "7". At this point, screen 700 is displayed, as depicted in FIG. 7A. Screen 700 displays dial string 611 containing the numeric value of the entered key, which is "7".

Since the primary value of the "7" key is the letter "B", screen 700 also shows the results of a filtering operation on the directory using the letter "B", including records from the directory that begin with the letter "B". Additional records that begin with "B" may be available, and may be accessed by scrolling. The filter is applied to multiple fields, so that the displayed records include those having a first name beginning with "B" (Biff Henderson), as well as those having a last name beginning with "B" (John Birch, CJ Bush). In one embodiment, records having a company name, or initials, or other relevant field that begins with "B" would also be displayed. The first telephone number in the first displayed record is selected (as indicated by highlight 604), although in alternative embodiments other records might be selected. Screen 700 also includes lookup string field 605 that displays the lookup string, consisting of the primary values for the keystrokes entered thus far. Accordingly, a "b" is currently displayed, indicating that the user has entered the letter "B". Again, in an alternative embodiment, lookup string field 605 is not displayed, or the display of lookup string field 605 is configurable by the user.

At this point the invention cannot determine whether the user is attempting to look up a directory record or direct-dialing a telephone number. In fact, the behavior of the user at this point is identical to the behavior of the user in the previous example prior to the display of screen 610, since in both cases the "B" key (having a secondary value of "7") was pressed. Thus, screen 700 is identical to screen 610.

Figure 7B:
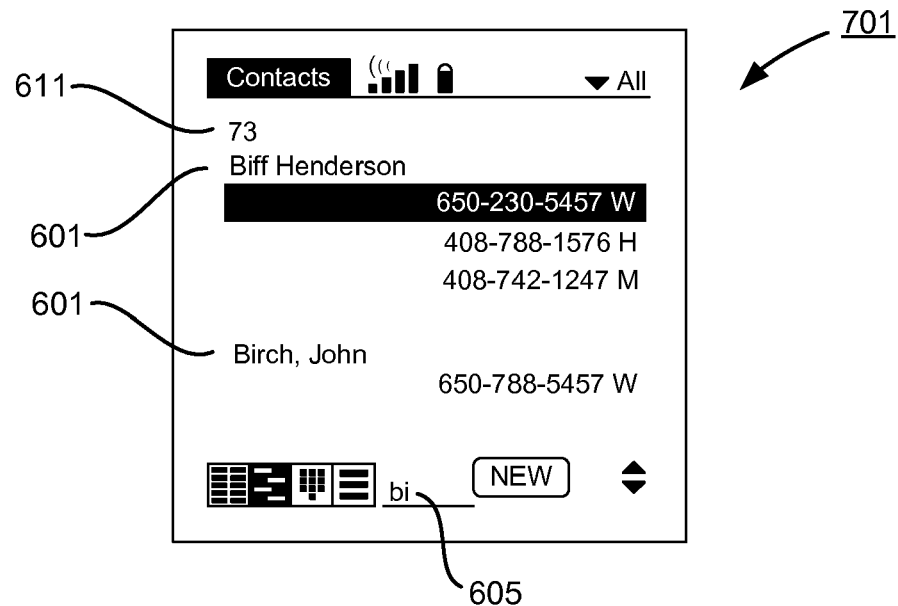

Continuing to dial the number, the user presses the key having a numeric secondary value of "3". At this point, screen 701 is displayed, as depicted in FIG. 7B. Dial string 611 is displayed, and now reads "73", corresponding to the numeric values of the two keys thus far entered.

Since the primary value of the "3" key is the letter "I", screen 700 also shows the results of a filtering operation on the directory using the lookup string "BI", including records from the directory that begin with the letters "BI". Again, additional records that begin with "BI" may be accessible via scrolling. Now, two records are displayed: Biff Henderson (since the first name begins with "BI") and John Birch (since the last name begins with "BI"). Lookup string field 605 now shows "bi".

Since the invention still cannot determine whether the user is performing directory lookup or direct-dial, both forms of feedback are still displayed. In fact, the behavior of the user at this point is identical to the behavior of the user in the previous example prior to the display of screen 620, since in both cases the "B" key and the "I" key (having secondary values of "7" and "3", respectively) were pressed. Thus, screen 701 is identical to screen 620.

Figure 7C:
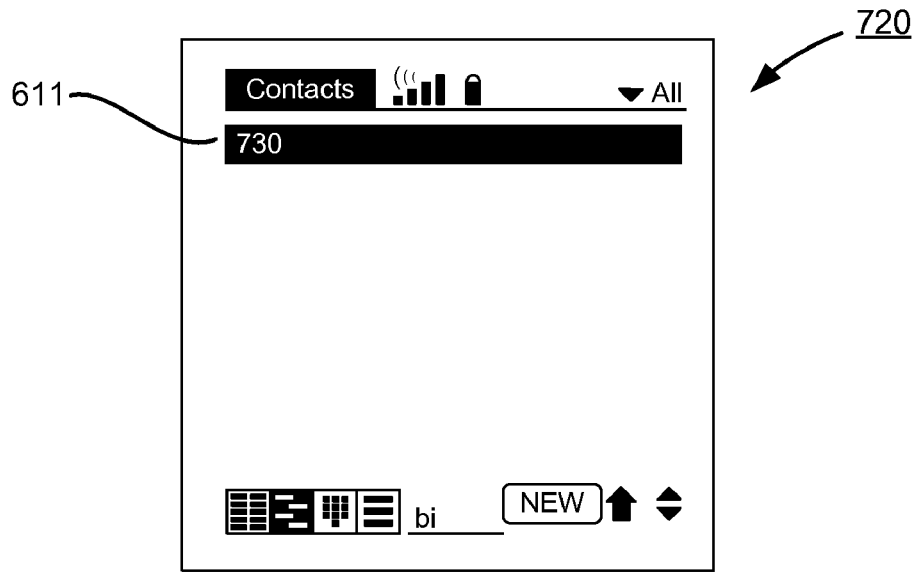

Next, the user presses the key having a numeric secondary value of "0". At this point, screen 720 is displayed, as depicted in FIG. 7C. Dial string 611 is displayed, and now reads "730", corresponding to the numeric values of the three keys thus far entered.

The primary value of the "0" key is a symbol, which has special meaning when entering text. It is used for accessing special symbols that are not displayed on the keyboard. No records in the database begin with the string "BI" followed by a special symbol. Thus, the filtering operation on this lookup string yields no results, and no records are now displayed. The invention can now infer that the user is direct-dialing a number, since all the entered keystrokes have numeric values and the lookup string yields no results. Accordingly, dial string 611 is now highlighted to indicate that it is the only valid operation. However, if the user were to now press backspace key 203 at this point, deleting the "0", the lookup string would revert to "BI" and screen 701 would again be displayed.

Figure 7D:
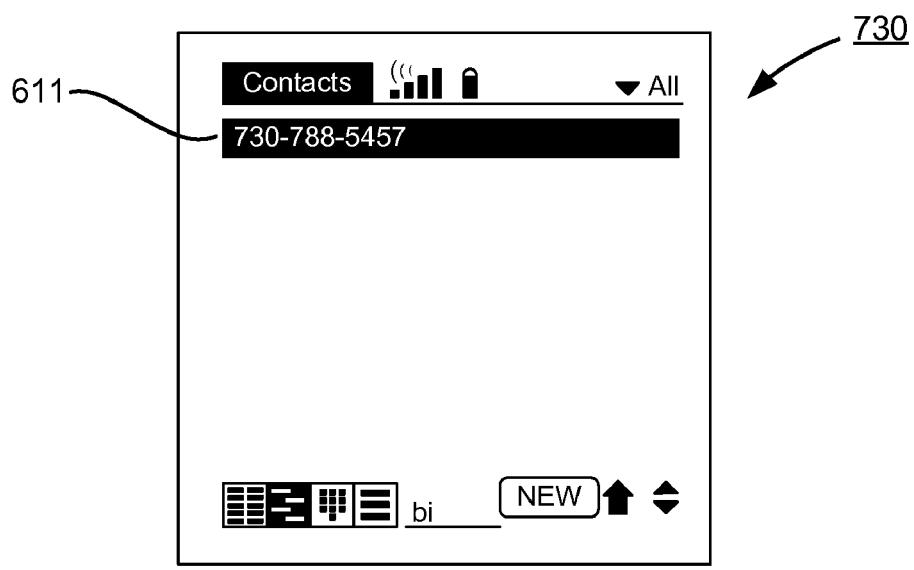

At this point, the user simply enters the remaining digits in the number being dialed. Referring now to FIG. 7D, there is shown display screen 730 after the user has completed entry of a ten-digit telephone number. Hyphens in dial string 611 may be added automatically, according to standard telephone number syntax. Once the user has finished entering the number, he or she presses space bar 207 or enter key 204 to dial the number. Alternatively, the user may tap the number on the screen (with a stylus or finger), or may press a jog rocker control (not shown).

In one embodiment, once the invention has reached a state where no records match the lookup string (e.g. screen 720), non-numeric keystrokes are rejected. Thus, if the user presses a key that does not have a numeric value, the invention may ignore the keystroke, or may provide feedback (such as a beep, for example) indicating that the entry is invalid.

As can be seen from the above description and examples, the present invention allows the user to perform a directory filtering operation or to direct-dial a number, on a keyboard having multiple-value keys, without first specifying which operation is intended. The invention further provides functionality for filtering on multiple fields in a directory, including derived fields and/or combination fields. As will be understood by those familiar with the art, the invention may be embodied in other specific forms without departing from the spirit or essential characteristics thereof. For example, the particular architectures depicted above are merely exemplary of one implementation of the present invention. The functional elements, method steps, screen shots, and user interface elements described above are provided as illustrative examples of one technique for implementing the invention; one skilled in the art will recognize that many other implementations are possible without departing from the present invention as recited in the claims. Likewise, the particular capitalization or naming of the modules, protocols, features, attributes, or any other aspect is not mandatory or significant, and the mechanisms that implement the invention or its features may have different names or formats. Accordingly, the disclosure of the present invention is intended to be illustrative, but not limiting, of the scope of the invention, which is set forth in the following claims.

What is claimed is:

1. A computer-implemented method for concurrently accepting parameters in at least two contexts, the method comprising:

receiving, in a mobile computing device, an input corresponding to a character sequence comprising at least one character, each character having a first value associated with a first operating mode, and at least one of the characters having a second value associated with a second operating mode;

the mobile computing device automatically determining whether the character sequence produces a valid result in both a first context associated with the first operating mode and a second context associated with the second operating mode at the same time;

responsive to the character sequence providing a valid result in the first context and not producing a valid result in the second context, the mobile computing device automatically performing a first action in the first operating mode corresponding to the first context using the first value for each character;

responsive to the character sequence producing the valid result in the second context and not producing the valid result in the first context, the mobile computing device automatically performing a second action in the second operating mode corresponding to the second context using the second value for each character;

responsive to the character sequence producing the valid result in the first context and the character sequence producing the valid result in the second context, performing a selection action to identify the first operating mode or the second operating mode.

2. The method of claim 1, further comprising:
outputting, on a display device, a first feedback responsive to the character sequence producing a valid result in the first context, the first feedback indicating character input according to the first context; and
outputting, on a display device, a second feedback responsive to the character sequence producing a valid result in the second context, the second feedback indicating character input according to the second context.

3. The method of claim 1, wherein the mobile computing device comprises a handheld device.

4. The method of claim 1, wherein receiving, in a mobile computing device, a character sequence comprises:
receiving a keystroke sequence from a plurality of keys, a subset of the keys having the first value associated with the first operating mode and the second value associated with the second operating mode.

5. The method of claim 4, wherein the plurality of keys comprise a QWERTY keyboard.

6. The method of claim 4, wherein the plurality of keys comprise a dial pad.

7. The method of claim 1, wherein at least one of the first value and the second value comprises a numeric value.

8. The method of claim 1, wherein at least one of the first value and the second value comprises an alphabetic value.

9. The method of claim 1, wherein at least one of the valid result in the first context and the valid result in the second context comprises accepting input for entering alphabetic information.

10. The method of claim 1, wherein at least one of the valid result in the first context and the valid result in the second context comprises accepting input for entering numeric information.

11. The method of claim 1, wherein determining whether the character sequence produces a valid result in a first context comprises determining whether at least one character in the character sequence has an alphabetic value.

12. The method of claim 1, wherein determining whether the character sequence produces a valid result in a second context comprises determining whether at least one character in the character sequence has a numeric value.

13. The method of claim 1, wherein the selection action comprises:
receiving an input identifying the first operating mode or the second operating mode.

14. The method of claim 1, wherein the selection action comprises:
identifying a previously stored preference identifying the first operating mode or the second operating mode.

15. A system for concurrently accepting parameters in at least two contexts, the system comprising:
an input device structured to receive a character sequence, the character sequence comprising at least one character, each character having a first value associated with a first operating mode, and at least a subset of the characters having a second value associated with a second operating mode;
a buffer, coupled to the character input device, structured to store the character sequence entered on the character input device;
a string handler, coupled to the buffer, structured to automatically determine, at the same time, whether the character sequence produces a valid result in a first context associated with the first operating mode and whether at least one of the characters is valid in a second context;
a processor, coupled to the string handler, the processor:
responsive to the character sequence producing a valid result in the first context and not producing a valid result in the second context, structured to automatically perform a first action in the first operating mode corresponding to the first context using the first value for each character; and
responsive to the character sequence producing the valid result in the second context associated with the second operating mode and not producing the valid result in the first context, structured to automatically perform a second action in the second operating mode corresponding to the second context using the second value for each character;
responsive to the character sequence producing a valid result in the first context and the character sequence producing a valid result in the second context, structured to perform a selection action to identify the first operating mode or the second operating mode.

16. The system of claim 15, further comprising:
an output device, coupled to the string handler, for:
outputting a first feedback responsive to the character sequence producing a valid result in the first context, the first feedback indicating character input according to the first context; and
outputting a second feedback responsive to the character sequence producing a valid result in the second context, the second feedback indicating character input according to the second context.

17. The system of claim 15, wherein the character input device comprises a plurality of keys, a subset of the keys having the first value and the second value.

18. The system of claim 17, wherein the plurality of keys comprise a QWERTY keyboard.

19. The system of claim 17, wherein the plurality of keys comprise a dial pad.

20. The system of claim 15, wherein the character input device comprises a touch sensitive screen displaying a plurality of keys, a subset of the keys having the first value and the second value.

21. The system of claim 15, wherein at least one of the first value and the second value comprises a numeric value.

22. The system of claim 15, wherein at least one of the first value and the second value comprises an alphabetic value.

23. The system of claim 15, wherein at least one of the valid result in the first context and the valid result in the second context comprises accepting input for entering alphabetic information.

24. The system of claim 15, wherein at least one of the valid result in the first context and the valid result in the second context comprises accepting input for entering numeric information.

25. The system of claim 15, wherein determining whether the character sequence produces a valid result in a first context comprises determining whether at least one character in the character sequence has an alphabetic value.

26. The system of claim 15, wherein determining whether the character sequence produces a valid result in a second context comprises determining whether at least one character in the character sequence has a numeric value.

27. The system of claim 15, wherein the selection action comprises:
receiving an input identifying the first operating mode or the second operating mode.

28. The system of claim 15, wherein the selection action comprises:

identifying a previously stored preference identifying the first operating mode or the second operating mode.

29. A computer program product comprising a computer-readable storage medium having computer-readable code embodied therein for concurrently accepting parameters in at least two contexts, the compute program product comprising:
computer-readable program code configured to cause a processor to receive a character sequence comprising at least one character, each character having a first value associated with a first operating mode, and at least one of the characters having a second value associated with at second operating mode;
computer-readable program code configured to cause the processor to automatically determine whether the character sequence produces a valid result in both a first context associated with the first operating mode and a second context associated with the second operating mode at the same time;
computer-readable program code configured to cause a processor to, responsive to the character sequence producing a valid result in the first context and not producing a valid result in the second context, automatically performing a first action in the first operating mode corresponding to the first context using the first value for each character;
computer-readable program code configured to cause a processor to, responsive to the character sequence producing the valid result in the second context associated with the second operating mode and not producing the valid result in the first context, automatically perform a second action in the second operating mode corresponding to the second context using the second value for each character;
computer-readable program code configured to cause a processor to, responsive to the character sequence producing the valid result in the first context and the character sequence producing the valid result in the second context, perform a selection action to identify the first operating mode or the second operating mode.

30. The computer program product of claim 29, further comprising:
computer-readable program code configured to cause a processor to output a first feedback responsive to the character sequence producing a valid result in the first context, the first feedback indicating character input according to the first context;
computer-readable program code configured to cause a processor to output a second feedback responsive to the character sequence producing a valid result in the second context, the second feedback indicating character input according to the second context.

31. The computer program product of claim 29, wherein the processor is configured within a mobile computing device.

32. The computer program product of claim 31, wherein the mobile computing device comprises a handheld device.

33. The computer program product of claim 31, wherein the mobile computing device comprises a mobile phone.

34. The computer program product of claim 29, wherein the computer-readable program code configured to cause a computer to receive a character sequence comprises:
computer-readable program code configured to cause a processor to receive a keystroke sequence from an input device having a plurality of keys, a subset of the keys having the first value and the second value.

35. The computer program product of claim 34, wherein the plurality of keys comprise a QWERTY keyboard.

36. The computer program product of claim 34, wherein the plurality of keys comprise a dial pad.

37. The computer program product of claim 29, wherein at least one of the first value and the second value comprises a numeric value.

38. The computer program product of claim 29, wherein at least one of the first value and the second value comprises an alphabetic value.

39. The computer program product of claim 29, wherein at least one of the valid result in the first context and the valid result in the second context comprises accepting input for entering alphabetic information.

40. The computer program product of claim 29, wherein at least one of the valid result in the first context and the valid result in the second context comprises accepting input for entering numeric information.

41. The computer program product of claim 29, wherein the computer-readable program code configured to cause a computer to determine whether the character sequence produces a valid result in the first context comprises:
computer-readable program code configured to cause a processor to determine whether at least one character in the character sequence has an alphabetic value.

42. The computer program product of claim 29, wherein the computer-readable program code configured to cause a computer to determine whether the character sequence produces a valid result in a second context comprises:
computer-readable program code configured to cause a processor to determine whether at least one character in the character sequence has a numeric value.

43. The computer program product of claim 29, wherein the selection action comprises:
receiving an input identifying the first operating mode or the second operating mode.

44. The computer program product of claim 29, wherein the selection action comprises:
identifying a previously stored preference identifying the first operating mode or the second operating mode.

* * * * *

UNITED STATES PATENT AND TRADEMARK OFFICE
CERTIFICATE OF CORRECTION

PATENT NO. : 7,681,146 B2
APPLICATION NO. : 11/112182
DATED : March 16, 2010
INVENTOR(S) : Jeffrey C. Hawkins et al.

It is certified that error appears in the above-identified patent and that said Letters Patent is hereby corrected as shown below:

Under Related U.S. Application Data, in field (63), insert --Continuation of application No. 09/976,477, filed on Oct. 12, 2001 which claims benefit of a provisional application No. 60/297,817 filed on June 11, 2001.--.
Claim 29, line 6, replace "compute" with --computer--.
Claim 29, line 11, replace "at" with --a--.

Signed and Sealed this

Twenty-third Day of November, 2010

David J. Kappos
*Director of the United States Patent and Trademark Office*

UNITED STATES PATENT AND TRADEMARK OFFICE
CERTIFICATE OF CORRECTION

PATENT NO. : 7,681,146 B2  Page 1 of 1
APPLICATION NO. : 11/112182
DATED : March 16, 2010
INVENTOR(S) : Jeffrey C. Hawkins et al.

It is certified that error appears in the above-identified patent and that said Letters Patent is hereby corrected as shown below:

Under Related U.S. Application Data, in field (63), insert --Continuation of application No. 09/976,477, filed on Oct. 12, 2001 which claims benefit of a provisional application No. 60/297,817 filed on June 11, 2001.--.
Claim 29, column 25 line 6, replace "compute" with --computer--.
Claim 29, column 25 line 11, replace "at" with --a--.

This certificate supersedes the Certificate of Correction issued November 23, 2010.

Signed and Sealed this

Fourteenth Day of December, 2010

David J. Kappos
*Director of the United States Patent and Trademark Office*